United States Patent
Hölzle et al.

(10) Patent No.: US 6,510,498 B1
(45) Date of Patent: *Jan. 21, 2003

(54) METHOD AND APPARATUS FOR MEMORY ALLOCATION IN A MULTI-THREADED VIRTUAL MACHINE

(75) Inventors: Urs Hölzle, Goleta, CA (US); Steffen Grarup, Palo Alto, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/724,737

(22) Filed: Nov. 28, 2000

Related U.S. Application Data

(63) Continuation of application No. 09/108,047, filed on Jun. 30, 1998, now Pat. No. 6,209,066.

(51) Int. Cl.[7] .............................................. G06F 12/00
(52) U.S. Cl. ........................ 711/153; 711/170; 711/173
(58) Field of Search ................................. 711/153, 170, 711/173; 709/104, 105, 107, 108, 312; 712/206, 215, 245, 246

(56) References Cited

U.S. PATENT DOCUMENTS

| 5,247,634 A | 9/1993 | Cline et al. |
| 5,535,361 A | 7/1996 | Hirata et al. |
| 5,600,596 A | 2/1997 | Shirakihara |
| 5,727,178 A | * 3/1998 | Pletcher et al. ............. 711/202 |
| 5,893,159 A | * 4/1999 | Schneider .................... 711/150 |

OTHER PUBLICATIONS

Robert H. Halstead, Jr., "Multilisp: A Language for Concurrent Symbolic Computation," Oct. 1985, ACM Transactions on Programming Languages and Systems, vol. 7, No. 4.

* cited by examiner

*Primary Examiner*—Matthew Kim
*Assistant Examiner*—Pierre M. Vital
(74) *Attorney, Agent, or Firm*—Beyer Weaver & Thomas

(57) ABSTRACT

Methods and apparatus for the efficient allocation of shared memory in a multi-threaded computer system are disclosed. In accordance with one embodiment of the present invention, a computer-implemented method for allocating memory shared by multiple threads in a multi-threaded computing system includes partitioning the shared memory into a plurality of blocks, and grouping the multiple threads into at least a first group and a second group. A selected block is allocated to a selected thread which may attempt to allocate an object in the selected block. The allocation of the selected block to the selected thread is based at least partially upon whether the selected thread is a part of the first group or the second group. In one embodiment, grouping the multiple threads into the first group and the second group includes identifying a particular thread and determining whether the particular thread is a fast allocating thread. In such an embodiment, when the particular thread is fast allocating, the particular thread is grouped into the first group.

19 Claims, 14 Drawing Sheets

METHOD AND APPARATUS FOR MEMORY ALLOCATION IN A MULTI-THREADED VIRTUAL MACHINE

This is a Continuation application of prior application Ser. No. 09/108,047 filed on Jun. 30, 1998 now U.S. Pat. No. 6,209,066, the disclosure of which is incorporated herein by reference.

BACKGROUND OF THE INVENTION

1. Field of Invention

The present invention relates generally to memory allocation in computer systems. More particularly, the present invention relates to efficient, low-overhead memory allocation in multi-threaded, object-based computer systems.

2. Description of the Related Art

As the use of virtual machines in computer technology increases, improving the overall efficiency of a virtual machine is becoming more important. The amount of memory associated with a computer system that includes a virtual machine is typically limited. As such, memory must generally be conserved and recycled. Many computer programming languages enable software developers to dynamically allocate memory within a computer system, while other programming languages require explicit manual deallocation of previously allocated memory, which deallocation may be complicated and prone to error. Languages that require explicit manual memory management include the C and C++ programming languages. Other programming languages utilize automatic storage-reclamation to reclaim memory that is no longer necessary to ensure the proper operation of computer programs that allocate memory from the reclamation system. Such automatic storage-reclamation systems reclaim memory without explicit instructions or calls from computer programs which were previously utilizing the memory.

In object-oriented or object-based systems, the typical unit of memory allocation is commonly referred to as an object or a memory object, as will be appreciated by those skilled in the art. Objects that are in use are generally referred to as "live" objects, whereas objects that are no longer needed to correctly execute computer programs are typically referred to a "garbage" objects. The act of reclaiming garbage objects is commonly referred to as garbage collection, and an automatic storage-reclamation system is often referred to as a garbage collector. Computer programs written in languages such as the Java™ programming language (developed by Sun Microsystems, Inc.) and the Smalltalk programming language use garbage collection to automatically manage memory.

The use of a compacting garbage collector generally allows objects to be allocated relatively quickly. That is, one advantage of using a compacting garbage collector is fast allocation of objects. Objects may be allocated in a contiguous memory area, e.g., an allocation area, such that the allocation of the objects may be performed by incrementing an allocation pointer by the desired amount of storage. When the end of the allocation area has been reached, a garbage collection may be performed.

One garbage collection method is a generational garbage collection method. A generational garbage collection method is a method in which objects are separated based upon their lifetimes as measured from the time the objects were created. Generational garbage collection is described in more detail in *Garbage Collection: Algorithms for Automatic Dynamic Memory Management* by Richard Jones and Rafael Lins (John Wiley & Sons Ltd., 1996), which is incorporated herein by reference in its entirety. "Younger" objects have been observed as being more likely to become garbage than "older" objects. As such, generational garbage collection may be used to increase the overall efficiency of memory reclamation.

In a system that uses generational garbage collection, a special memory area is designated for the allocation of new objects. Such a memory area is generally considered to be a "nursery," as new objects are allocated within the memory area. As will be appreciated by those skilled in the art, the memory area is often referred to as "Eden."

FIG. 1a is a diagrammatic representation of a single thread and a memory allocation area that is dedicated to the single thread. Such a memory allocation area is suitable for implementation within a single-threaded system that uses generational garbage collection. As shown, a memory allocation area 102, which may be known as Eden, is indexed by an allocation pointer 104. In general, Eden 102 is a block of memory in which new objects may be created. When a thread 106, which is associated with Eden 102, attempts to allocate a new object, allocation pointer 104 is typically incremented by the size of the new object, and a check is made to determine if allocation pointer 104 has reached the end of Eden 102. When it is determined that the end of Eden 102 has been reached, a generational garbage collection may be performed to effectively empty Eden 102, thereby allowing new objects to be created by thread 106 within Eden 102.

While the allocation of memory and, hence, new objects, as described with respect to FIG. 1a is effective in a single-threaded system, such an allocation of memory and objects generally may not be used in a multi-threaded system with multiple central processing units (CPUs). By way of example, when two threads concurrently attempt to request space in a single Eden, concurrency problems may arise. As such, in a multi-threaded system, when Eden is a shared resource, access to Eden must generally be synchronized in order to prevent more than one thread from allocating in Eden at any given time. Synchronizing access to Eden may involve associating an allocation lock with Eden that is obtained by a thread when the thread wishes to create a new object, and released by the thread after the new object has been created.

FIG. 1b is a diagrammatic representation of two threads and a memory allocation area shared by the two threads within an overall multi-threaded system. An Eden 112 has an associated allocation pointer 114 which is arranged to indicate the beginning of an unused portion 115 of Eden 112. When threads 116 and 118, which share Eden 112, wish to allocate a new object in Eden 112, they must generally obtain the allocation lock (not shown) associated with Eden 112. Specifically, if thread 116 wishes to access unused portion 115, thread 116 must obtain the allocation lock on Eden 112. Once thread 116 obtains the allocation lock, and it is determined that the end of Eden 112 has not been reached, allocation pointer 114 may be incremented, and a new object may be allocated by thread 116. If the end of Eden 112 has been reached, i.e., when unused portion 115 is null, a garbage collection may be performed to effectively empty Eden 112, thereby allowing new objects to be created by threads 116 and 118.

When access to Eden is synchronized, the allocation of new objects within Eden is typically slowed considerably due to the overhead associated with the acquisition of and the releasing of the allocation lock associated with Eden. Each time a thread wishes to create a new object in Eden, the thread must acquire exclusive rights to Eden, as for example by acquiring an allocation lock. In general, even so-called "fast" locking primitives which are directly implemented by hardware, e.g., a compare-and-swap primitive, may be relatively slow when compared to the base costs associated with allocation. For instance, on a multiprocessor system, a locking primitive may incur a remote cache miss, as will be appreciated by those skilled in the art. In such a system, adding synchronization features often significantly increases the cost of allocation, e.g., by a factor of two or three. Hence, adding synchronization during allocation greatly affects the performance of the overall system.

In order to improve performance associated with accessing Eden in a multi-threaded system by avoiding synchronization, each thread in the multi-threaded system may be assigned its own Eden. That is, when each thread has its own Eden, concurrency problems that may arise when more than one thread attempts to access a shared Eden may be avoided. FIG. 2a is a diagrammatic representation of two threads with their own associated Edens, or memory allocation areas. Within a multi-threaded system 200, a first Eden 202, which is referenced by an allocation pointer 204, is associated with a first thread 206. Multi-threaded system 200 also includes a second Eden 212 that is referenced by an allocation pointer 204, and is associated with a second thread 216.

When first thread 206 wishes to allocate a new object, first thread 206 accesses first Eden 202. Similarly, when second thread 216 wishes to allocate a new object, second thread 216 accesses second Eden 212. As each thread 206, 216 has its own exclusive Eden, namely Edens 202 and 212, respectively, no allocation locks are needed to safeguard against two threads attempting to access a single Eden in order to create a new object at any given time.

Although allocating a separate Eden to each thread in a multi-threaded system may eliminate the need for allocation locks, allocating separate Edens often requires a substantial amount of memory. For example, some applications may contain hundreds or even thousands of threads. In addition, some threads may allocate objects at a faster speed than others and, hence, will generally require more memory. The requirement for more memory may lead to frequent garbage collections, performed over all memory, e.g., global garbage collections performed on all Edens, which would require some form of synchronization. As such, overall overhead associated with performing garbage collections on multiple Edens may increase and adversely affect the performance of the overall system, since some Edens may still be relatively empty while others are filled to capacity.

The use of a substantial amount of memory, as well as the increase in the overall overhead associated with garbage collection, that is associated with allocating a separate Eden to each thread in a multi-threaded system may be inefficient and expensive. Reducing the amount of memory used, as well as the frequency of garbage collection, increases the efficiency and generally decreases the costs associated with a multi-threaded system. Dividing an Eden into chunks, or blocks, typically allows an Eden to be shared without requiring allocation locks. The general division of Eden into chunks is described in "Multilisp: A Language for Concurrent Symbolic Computation" by R. Halstead, Jr. (ACM Transactions on Programming Languages and Systems, 7(4):501–538, October 1985), which is incorporated herein by reference in its entirety. FIG. 2b is a diagrammatic representation of two threads and a memory allocation area shared by the two threads in which the memory allocation area is divided into chunks. A multi-threaded system 230 includes an Eden 232 that is divided into chunks 233 which are of a consistent size. In other words, all chunks 233 are approximately the same size. Each thread 236, 238 which shares Eden 232 is allocated an initial chunk. By way of example, thread 236 is initially allocated chunk 233a, while thread 238 is initially allocated chunk 233b.

When a thread, e.g., thread 236, fills its chunk 233a, thread 236 is allocated another chunk 233c. Threads continue to be allocated chunks 233 until no chunks 233 are available, at which time a garbage collection may be performed. It should be appreciated that although the requests for chunks 233 are synchronized, the synchronization generally does not occur as frequently as the allocation synchronization that was previously mentioned.

Allocating chunks 233 to threads 236, 238 often results in substantial fragmentation, as each chunk 233 must generally be sized to hold a large object. Hence, when a chunk is partially full, and a large object created by a thread does not fit in the partially full chunk, a new chunk will be allocated to the thread to accommodate the large object. The space left in the partially full chunk is then effectively wasted. In addition, the allocation of space in the chunks may be inefficient when threads which are slow allocating are in possession of virtually empty chunks, thereby reserving memory space which may never be needed.

Therefore, what is desired is a method and an apparatus for efficiently allocating memory in a multi-threaded system such as a multi-threaded virtual machine. Specifically, what is needed is a method and an apparatus for allowing threads to create new objects in a memory allocation area, e.g., an Eden, while minimizing memory space, minimizing allocation costs, and improving the efficiency of garbage collection.

SUMMARY OF THE INVENTION

The present invention relates to the efficient allocation of shared memory in a multi-threaded computer system. In accordance with one embodiment of the present invention, a computer-implemented method for allocating memory shared by multiple threads in a multi-threaded computing system includes partitioning the shared memory into a plurality of blocks, and grouping the multiple threads into at least a first group and a second group. A selected block is allocated to a selected thread which may attempt to allocate an object in the selected block. The allocation of the selected block to the selected thread is based at least partially upon whether the selected thread is a part of the first group or the second group. In one embodiment, grouping the multiple threads into the first group and the second group includes identifying a particular thread and determining whether the particular thread is a fast allocating thread. In such an embodiment, when the particular thread is fast allocating, the particular thread is grouped into the first group.

According to another aspect of the present invention, a computer-implemented method for allocating shared memory in a multi-threaded computing system which includes at least a first thread and a second thread involves partitioning the shared memory into a plurality of blocks, and assigning a first block that is accessible to both the first thread and the second thread for the creation of new objects. After the system is allowed to run, a determination is effectively made as to whether the first block has overflowed. If it is determined that the first block has overflowed, the method includes determining whether an attempt by the first thread to allocate the first object in the first block caused the first block to overflow. If such is the case, a second block is assigned to the first thread. Assignment of the second block to the first thread is arranged to cause the first thread to effectively relinquish the ability to allocate objects in the first block. In one embodiment, the second thread does not have the ability to allocate objects in the second block.

In another embodiment, the method also includes determining when one of the first block and the second block have overflowed, as well as assigning a third block the first thread when it is determined that the second block overflowed, or assigning the third block to the second thread when it is determined that the first block overflowed. In such an embodiment, when it is determined that the first block overflowed, a fourth block may replace the first block.

According to still another aspect of the present invention, a computer-implemented method for allocating memory in a multi-threaded computing system includes partitioning the memory into a plurality of blocks which includes a first block and a second block that is substantially larger than the first block. The first block is assigned to be accessible to a first thread which is arranged to attempt to allocate a first object in the first block, and the second block is assigned to be accessible to the second thread in order for the second thread to attempt to allocate a second object in the first block. In one embodiment, the first block has a size in the range of approximately 1 kiloByte to approximately 4 kiloBytes, and the second block has a size in the range of approximately 16 kiloBytes to approximately 32 kiloBytes.

The present invention will be more readily understood upon reading the following detailed descriptions and studying the various figures of the drawings.

BRIEF DESCRIPTION OF THE DRAWINGS

The invention may be understood by reference to the following description taken in conjunction with the accompanying drawings in which.

DETAILED DESCRIPTION OF THE EMBODIMENTS

Figure 1A:
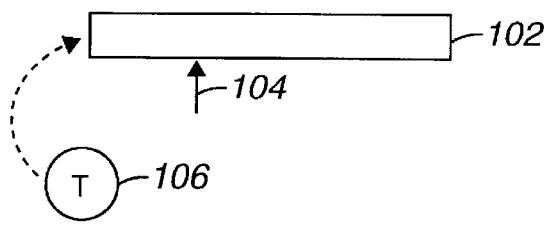
FIG. 1a is a diagrammatic representation of a thread and a memory allocation area.
Figure 1B:
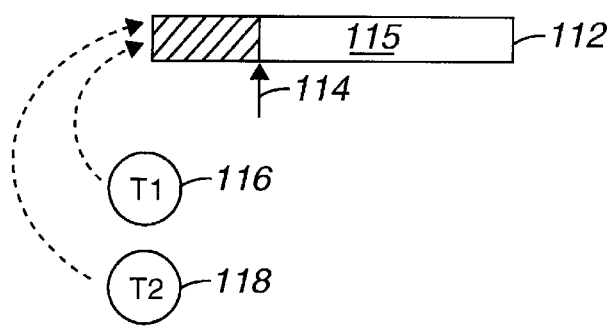
FIG. 1b is a diagrammatic representation of two threads and a memory allocation area shared by the two threads.
Figure 2A:
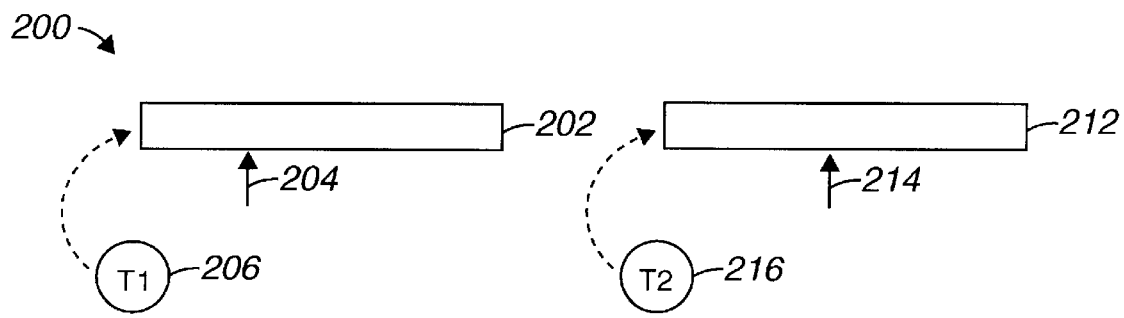
FIG. 2a is a diagrammatic representation of two threads with their associated memory allocation areas.
Figure 2B:
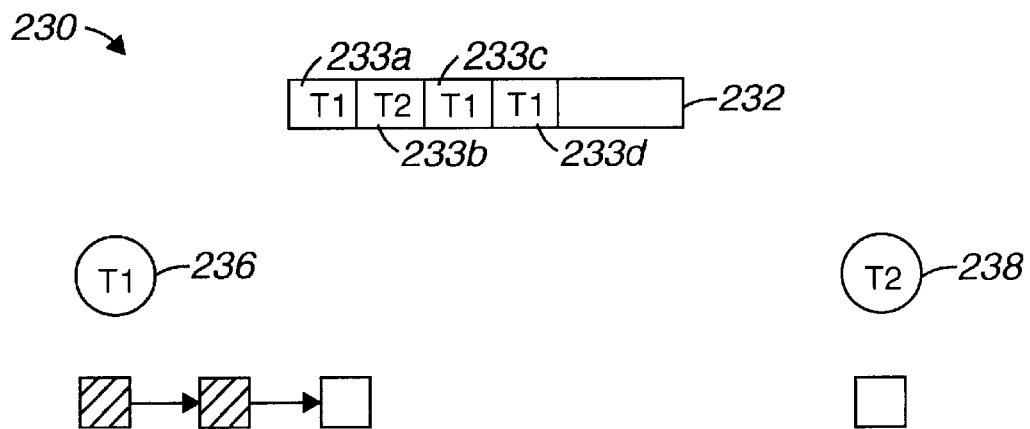
FIG. 2b is a diagrammatic representation of two threads and a memory allocation area shared by the two threads in which the memory allocation area is divided into chunks.

The overhead associated with allocating shared memory, e.g., an "Eden," in a multi-threaded system is often significant. Allocating a separate Eden to each thread in a multi-threaded system tends eliminate the need for allocation locks associated with synchronization. However, allocating separate Edens often requires a substantial amount of memory, and may lead to more frequent garbage collections, thereby potentially adversely affecting the performance of the overall system.

An Eden that is shared by multiple threads may be divided into equal chunks, or blocks, such that each thread has its own block. By allowing each thread to have its own block, an Eden may be shared without requiring allocation locks. However, dividing Eden into equal chunks and allowing each thread to have its own block often result in substantial fragmentation. For example, when a chunk is partially full and a large object created by a thread does not fit in the partially full chunk, a new chunk will be allocated to the thread to accommodate the large object. The space left in the partially full chunk is then effectively wasted. In addition, the allocation of space in the chunks may be inefficient when threads that rarely allocate objects are in possession of virtually empty chunks, thereby reserving memory space which may never be needed. When threads reserve memory space that may not be needed, the space is effectively taken away from threads which may need the memory space. Further, more frequent garbage collections, which involve substantial overhead, are likely to occur in order to free memory for use by threads which need additional memory space.

By allowing multiple threads which rarely allocate objects to share chunks or blocks of a shared memory allocation area, while providing threads which frequently allocate objects with "private," or unshared, memory blocks, more memory space is effectively provided to substantially only the threads that need more memory. Hence, more memory space is likely to be filled before garbage collections are performed. In addition, the frequency of garbage collection may also be reduced. Although synchronization is used when slow allocating threads, e.g., threads which rarely allocate objects, access a shared block, the synchronization costs may be relatively low, as slow allocating threads generally do not often need to access, or allocate in, the shared block. As such, the overhead associated with synchronization may be considered to be relatively insignificant.

In order to eliminate synchronization in the allocation of new objects in a shared memory area, different sized blocks may be created in a shared memory area such that all threads are assigned private blocks. Specifically, potentially slow allocating threads may be assigned smaller private blocks, while potentially fast allocating threads may be assigned larger unshared blocks. By assigning smaller blocks to slow allocating threads and larger blocks to fast allocating threads, increased memory space may be provided to the threads that are likely to need more memory in comparison to the memory space provided to the threads that are likely to need little memory, without the synchronization overhead associated with the allocation of new objects in shared memory.

First Embodiment

Figure 3:
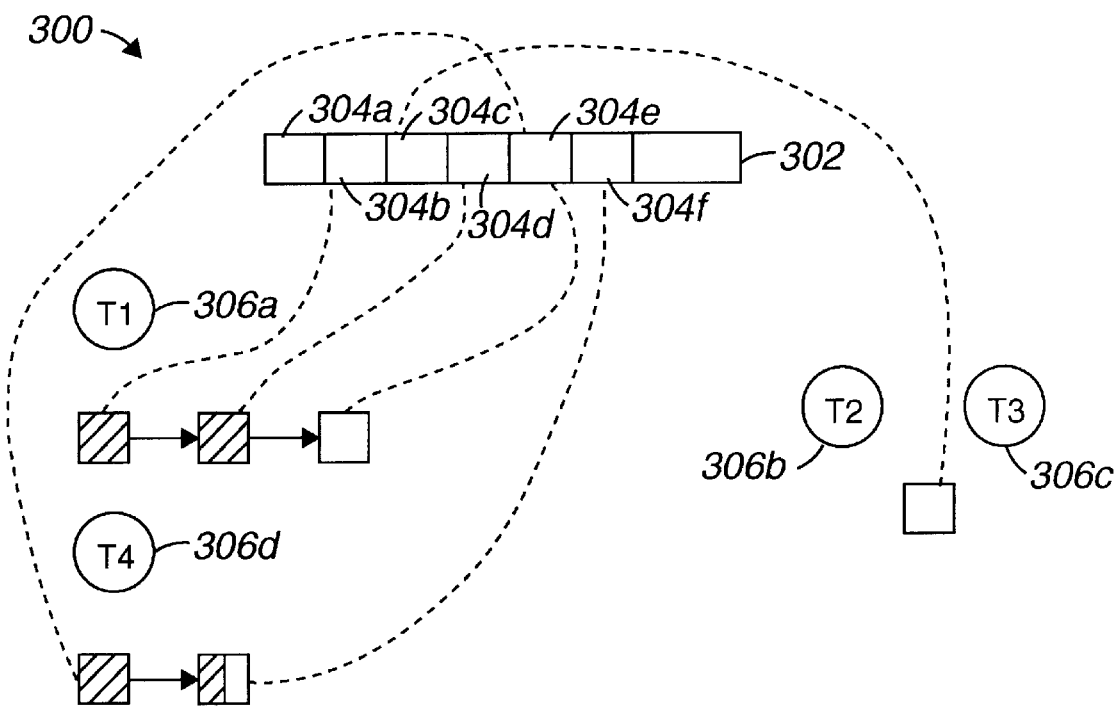
FIG. 3 is a diagrammatic representation of multiple threads and a memory allocation area shared by the multiple threads in accordance with a first embodiment of the present invention.

The division of a shared memory area into substantially equally sized blocks which may be described, and methods which may be used to allocated the equally sized blocks, will be described below with reference to FIGS. 3–7. As mentioned above, in one embodiment of the present invention, multiple threads may share a block of memory while other threads may be assigned private memory blocks. FIG. 3 is a diagrammatic representation of multiple threads and a memory allocation area shared by the multiple threads in accordance with a first embodiment of the present invention. An overall system 300 includes a shared memory allocation area 302. In one embodiment, memory allocation area 302 may be Eden. However, it should be appreciated that memory allocation area 302 may generally be any shared memory area in which new objects may be allocated.

Memory allocation area 302 is partitioned into blocks 304, or chunks, which are all of approximately the same size. The size of blocks 304 may generally be widely varied depending upon the requirements of system 300. By way of example, if system 300 has an associated Java™ Virtual Machine (developed by Sun Microsystems, Inc.), blocks 304 are typically sized such that each block 304 is between approximately 2 kiloBytes (kB) in size to approximately 32 kB in size. In such a system, memory allocation area 302 may range in size from approximately 128 kB to approximately 512 kB, although it should be appreciated that the overall size of memory allocation area 302 may be widely varied.

Within system 300, all threads 306 which may potentially be fast allocating, or otherwise likely to allocate a substantial amount of objects in memory allocation area 302, may eventually be assigned their own designated blocks 304. In the described embodiment, threads 306a, 306d are considered likely candidates to be fast allocating and, as a result, are each associated with private blocks. As will be described below with reference to FIGS. 4, 5a, 6, and 7, threads 306 which are considered as likely to be fast allocating are threads 306 which cause a shared block to overflow, e.g., run out of memory space. Typically, when threads 306a, 306d overflow their designated, e.g., private, blocks 304, as long as additional blocks 304 are available, threads 306a, 306d may be assigned additional blocks 304. As shown, thread 306a has been assigned blocks 304b, 304d, and 304f, where blocks 304b, 304d are full. Thread 306d has been assigned blocks 304e, 304f and, as shown, block 304e is full, while block 304f is partially full. Since thread 306a has its own private blocks 304b, 304d, and 304f, when thread 306a attempts to allocate a new object in one of its blocks, synchronization is not required. Similarly, when thread 306d attempts to allocate a new object in one of its blocks, it also does not need to acquire an allocation lock or similar device.

Threads 306 which are not considered to be fast allocating, e.g., threads 306b and 306c, are assigned to a shared block, e.g., block 304c. Threads 306b, 306c are assigned shared block 304c, such that both threads 306b, 306c may allocate new objects in block 304c. Although synchronization is typically used to prevent concurrency problems when threads 306b, 306c attempt to substantially simultaneously access block 304c, since threads 306b, 306c are considered likely to be slow allocating, the overhead associated with synchronization is generally insignificant. That is, threads 306b, 306c are expected to rarely attempt to allocate new objects in block 304c.

Figure 4:
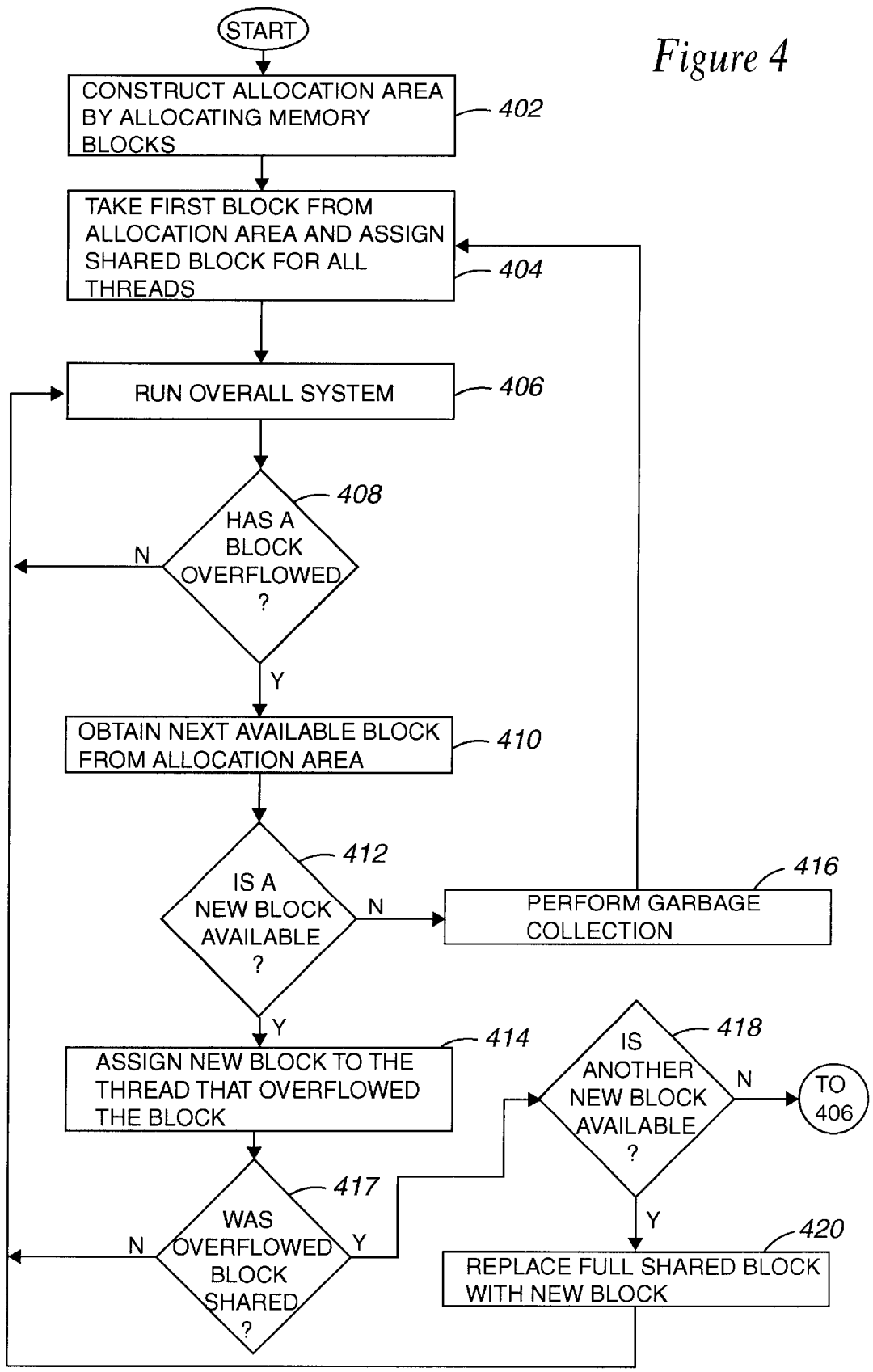
FIG. 4 is a process flow diagram which illustrates the steps associated with a first process of allocating memory in accordance with the first embodiment of the present invention.

Although the methods for allocating shared memory that is divided into blocks which may be shared may vary, several suitable methods will be described below with reference to FIGS. 4, 5a, 5b, 6, and 7. With reference to FIG. 4, the steps associated with a first method of allocating memory that is shared by multiple threads will be described in accordance with the first embodiment of the present invention. That is, FIG. 4 relates to one method of allocating memory in a shared memory system as discussed above with reference to FIG. 3. In this method, any time a shared memory block is overflowed, the thread that caused the memory block to overflow may be allocated its own memory block, since that thread is generally statistically likely to be a fast allocating thread.

The first method of allocating memory begins at step 402 in which a shared memory allocation area, e.g., Eden, is constructed by allocating multiple memory blocks within the shared memory allocation area. In the described embodiment, the multiple memory blocks that are allocated, partitioned, or otherwise created, are of substantially the same size. Although the size may be widely varied depending upon the requirements of a particular system, the size is typically in the range of approximately 2 kB to approximately 32 kB.

After the memory in the allocation area is allocated, a first block in the allocation area is assigned in step 404 to be a shared block for all threads which may attempt to allocate a new object in the allocation area. By assigning a shared block for all threads, each time one of the threads allocates a new object, an attempt is made to allocate the new object in the shared block. It should be appreciated that when threads share a block, allocation locks, or similar devices, are often used for synchronization purposes during object allocation.

Once the shared block is assigned, the overall system is run in step 406. In other words, the computing system associated with the threads is allowed to run. The overall system is generally allowed to run until one of the threads discovers that a block, e.g., the shared block, in the allocation area has overflowed. As such, a determination is made in step 408 as to whether a block has overflowed.

Until the determination in step 408 is that a block such as the shared block has overflowed, then the system is allowed to continue running in step 406. When it is determined that a block has overflowed, then process flow proceeds to step 410 where an attempt is made to obtain the next available block from the allocation area. In step 412, a determination is made regarding whether a block is available. That is, a determination is made as to whether there are "free" memory blocks available in the allocation area. When a new block is available, the new block is assigned in step 414 to the thread that caused the block to overflow during the running of the system. It should be appreciated that initially, i.e., until a private block has been assigned to a thread, the new block is assigned to the thread that caused the shared block to overflow. Once a private block has been assigned to a thread, however, the new block may be assigned to the thread with the private block or the threads that share a block, as either the private block or the shared block may have overflowed.

Threads typically use one of two allocation routines, depending upon whether they have a private or shared allocation block. Threads with a private block may use a non-locking, fast-allocation routine to reduce locking overhead, while threads with a shared block typically use a locking, slow-allocation routine, as will be appreciated by those skilled in the art. Thus, when a thread is assigned a private block, its allocation routine is typically set to the non-locking routine. Conversely, when a thread is assigned a private block, its allocation routine is typically set to the locking routine.

Generally, it is expected that a thread which causes a shared block to overflow is a thread which has the tendency to allocate objects fairly often. As such, by assigning a private block to such a thread, the overhead associated with acquiring and releasing allocation locks on the shared block is likely to be reduced. The overhead is generally reduced because threads which often allocate new objects will typically be assigned private blocks, which do not use allocation locks. Since the threads which remain to share a shared block are often threads which rarely allocate new objects, the overhead associated with acquiring and releasing an allocation lock associated with the share block is generally relatively low.

After a new block is assigned to the thread that caused a block to overflow in step 414, a determination is made in step 417 regarding whether the overflowed block was a shared block. In general, after threads are in possession of private blocks, the block that was determined to be overflowed in step 408 may either be a private block or a shared block. Prior to the assignment of any private blocks, however, the block that overflows is a shared block.

When it is determined that the block that overflowed was not a shared block, then the indication is that the block that overflowed was a private block. If the overflowed block was a private block, then process flow moves from step 417 to step 406 where the overall system is allowed to run until a thread makes the discovery that a block has overflowed. Alternatively, if the determination in step 417 is that the overflowed block was a shared block, then it is determined in step 418 whether another new block is available in the allocation area.

If the determination in step 418 is that another block is available in the allocation area, the full shared block is replaced with the new block in step 420. Once the full shared block is replaced, the overall system is allowed to run in step 406. If, however, it is determined that there are effectively no available blocks in the allocation area, then process flow moves to step 406 where the system is allowed to run. It should be appreciated that the system will generally run, with a full or nearly full shared block, until a block, e.g., either a shared block or a private block, overflows.

Returning to step 412, when it is determined that a new block is not available, a garbage collection is performed in step 416. Although substantially any garbage collection algorithm may be used, in one embodiment, a generational garbage collection algorithm may be used. A generational garbage collection algorithm, i.e., a generational garbage collector, is typically arranged to copy live objects stored in the blocks of the allocation area, thereby leaving at least some of the blocks empty for new allocation. After a garbage collection is performed in step 416, process flow returns to step 404 where the first block in the allocation area is assigned as a shared block for all threads.

Figure 5A:
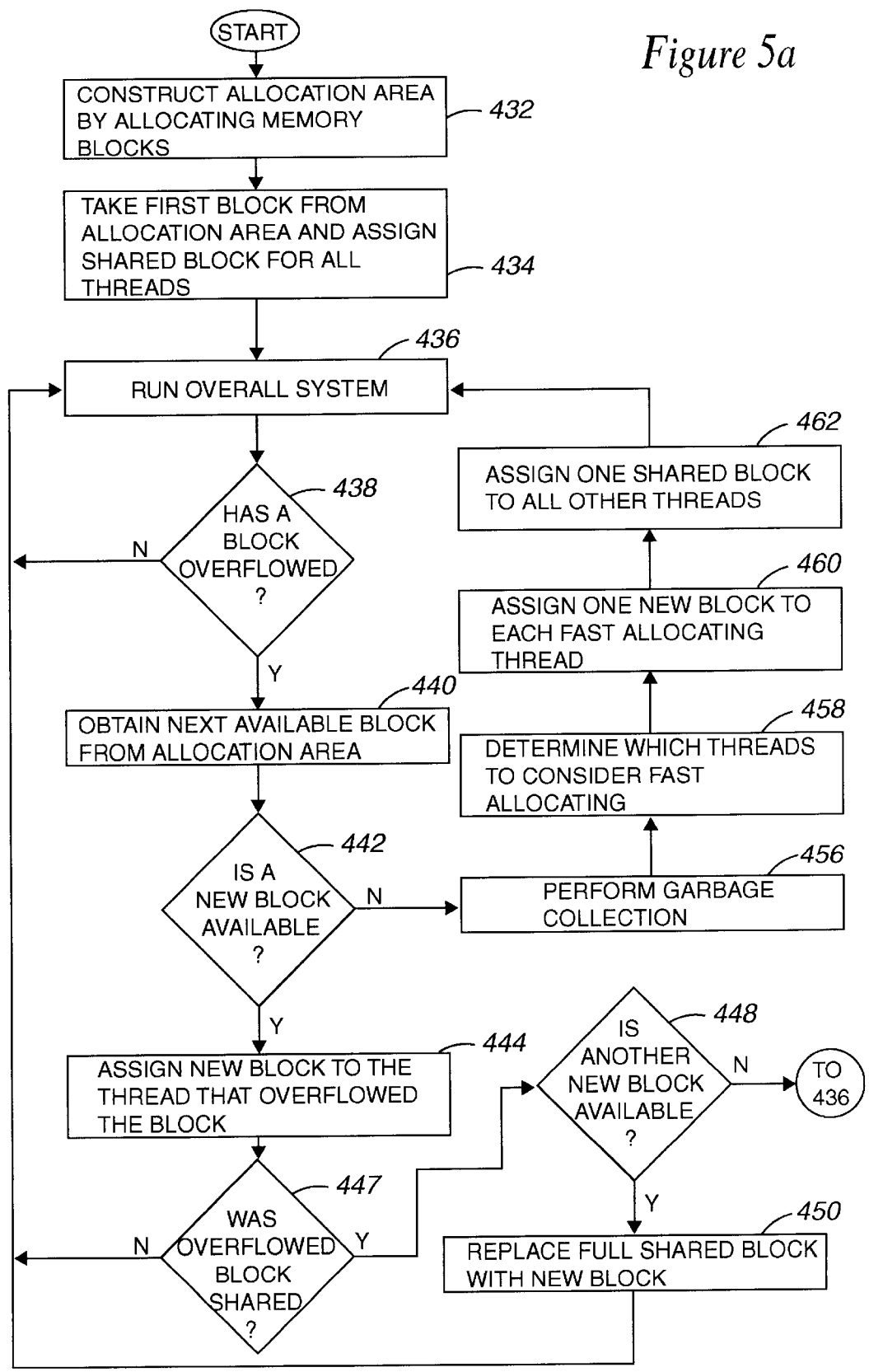
FIG. 5a is a process flow diagram which illustrates the steps associated with a second process of allocating memory in accordance with the first embodiment of the present invention.

FIG. 5a is a process flow diagram which illustrates the steps associated with a second process of allocating memory, which allows for determinations of whether particular threads are fast allocating threads, in accordance with the first embodiment of the present invention. The second method of allocating memory begins at step 432 in which a shared memory allocation area, e.g., Eden, is constructed by allocating multiple memory blocks within the shared memory allocation area. Once the memory in the allocation area is essentially divided into blocks, a first block in the allocation area is assigned in step 434 to be a shared block for all threads which may attempt to allocate a new object in the allocation area. By assigning a shared block for all threads, each time one of the threads allocates a new object, an attempt is made to allocate the new object in the shared block.

After the shared block is assigned, the overall system is run in step 436. The overall system is typically allowed to run until one of the threads discovers that a block, in the allocation area has overflowed. Such a discovery is, in effect, a determination that a block has overflowed. Thus, a determination is made in step 438 regarding whether a block has overflowed.

If the determination in step 438 is that a block such as the shared block has not overflowed, then the system is allowed to continue running in step 436. Alternatively, if it is determined that a block has overflowed, then process flow proceeds to step 440 where an attempt is made to obtain the next available block from the allocation area. Once the attempt is made to obtain the next available block, a determination is made regarding whether a block is available in step 442. That is, a determination is made as to whether there are effectively unused memory blocks available in the allocation area.

When it is determined that a new block is not available, a garbage collection is performed in step 456. In one embodiment, the garbage collection may involve a generational garbage collection algorithm which, as described above with respect to FIG. 4, is often arranged to copy live objects stored in the blocks of the allocation area into other areas of memory, thereby leaving at least some of the blocks of the allocation area empty for new allocation.

After a garbage collection is performed in step 456, it is determined in step 458 which threads to consider fast allocating. A determination of which threads to consider fast allocating is generally a determination of which threads allocate many new objects. One method of determining which threads to consider fast allocating will be described below with reference to FIG. 5b.

Once the fast allocating threads are identified, a new block is assigned to each thread that is considered to be fast allocating in step 460. That is, each fast allocating thread is assigned a private block. By assigning new blocks, i.e., new private blocks, to substantially only the fast allocating threads, threads which previously had private blocks but are no longer considered to be fast allocating threads may be prevented from reserving memory space which they are likely not to need. Furthermore, the fast allocating threads will continue to use fast, unsynchronized allocation.

In step 462, after new blocks are assigned to fast allocating threads, a shared block is assigned to all other threads, i.e., a shared block is assigned to all threads which are not considered to be fast allocating. After the threads which are not considered to be fast allocating, or, in other words, the threads which are considered to be slow allocating, are assigned a shared block, then process flow returns to step 436 in which the overall system is allowed to run.

Returning to step 442, when a new block is available, the new block is assigned in step 444 to the thread that caused the block to overflow during the running of the system. It should be appreciated that until a private block has been assigned to a thread, the new block is assigned to the thread that caused the shared block to overflow. The new block may generally be assigned to the thread with the private block, if any thread has already been assigned a private block, or the threads that share a block, as either the private block or the shared block may have overflowed.

Once a new block is assigned to the thread that caused a block to overflow, a determination is made in step 447 regarding whether the overflowed block was a shared block. Generally, after at least one thread is in possession of a private block, the block that was determined to be overflowed in step 438 may either be a private block or a shared block. However, prior to the assignment of any private blocks, the block that overflows is a shared block, as the shared block is the only block that is assigned to any threads.

When it is determined that the block that overflowed was not a shared block, then the implication is that the block that overflowed was a private block. If the overflowed block was a private block, then process flow returns from step 447 to step 436 where the overall system is allowed to run until another block has overflowed. Alternatively, if the determination in step 447 is that the overflowed block was a shared block, a determination is made in step 448 as to whether another new block, which is to be shared, is available in the allocation area.

If the determination in step 448 is that another block is available in the allocation area, the full shared block is replaced with the new block in step 450. Once the full shared block is replaced, the overall system is allowed to run in step 436. If, however, it is determined that there are effectively no available blocks in the allocation area, then process flow moves directly to step 436 where the system is allowed to run. It should be appreciated that the system will generally run, with a full or nearly full shared block, until a thread attempts to create a new object and discovers that the relevant block, e.g., either a shared block or a private block, has overflowed or will overflow as a result of the attempt to create a new object. Ultimately, process flow will react a determination, i.e., in step 442, of whether a new block is available. If a new block is not available, then a garbage collection will generally be performed, as previously described.

Figure 5B:
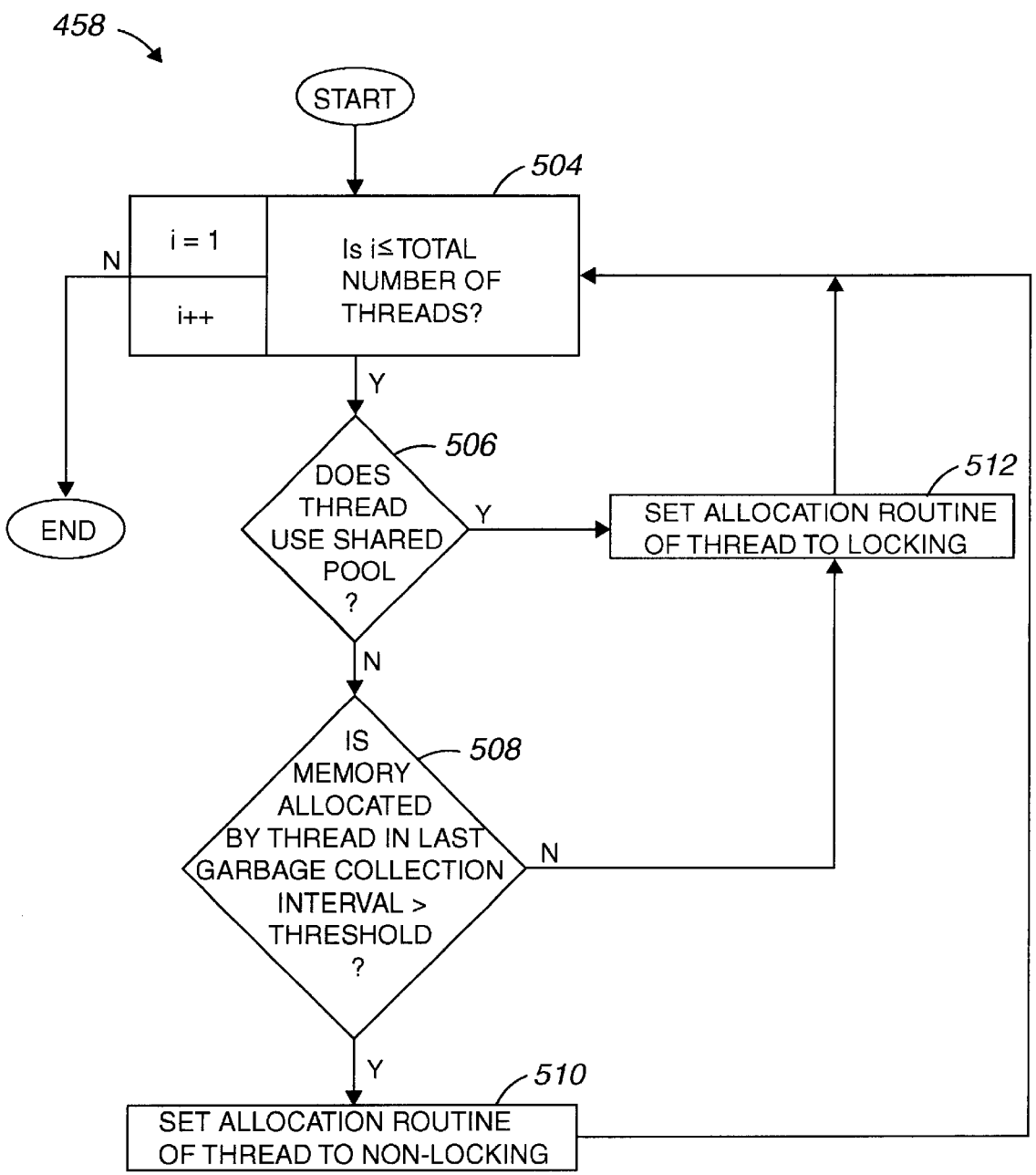
FIG. 5b is a process flow diagram which illustrates the steps associated with a determination of which threads are considered to be fast allocating threads, i.e., step 458 of FIG. 5a, in accordance with the first embodiment of the present invention.

With reference to FIG. 5b, one method of determining which threads are considered to be fast allocating threads, i.e., step 458 of FIG. 5a, will be discussed in accordance with the first embodiment of the present invention. The method of determining which threads are fast allocating threads begins at step 504, which is effectively a determination of whether there is a thread to be "tested" in order to identify whether it is a fast allocating thread. When there is not a thread to be tested, the process of determining whether threads are fast allocating or slow allocating is completed. Alternatively, when there is a thread to be tested, then in step 506, a determination is made as to whether the thread uses the shared pool, or shared blocks. In other words, it is determined in step 506 if the thread is currently a thread which is associated with a shared block.

If the determination is that the thread uses the shared pool, then the indication is that the thread is a slow allocating thread. Accordingly, process flow proceeds from step 506 to step 512 in which the allocation routine of the thread is set to locking. That is, the allocation routine of the thread is set such that when the thread attempts to allocate a new object, the thread obtains a lock associated with a shared block. As previously mentioned, the use of locks prevents one thread from allocating in a shared block while another thread is currently allocating in the shared block. After the allocation routine of the thread is set to locking in step 512, then process flow returns to step 504 and the determination of whether there is another thread to be processed.

Alternatively, if it is determined in step 506 that the thread does not use the shared block, then the indication is that the thread has at least one private block and, hence, may be a fast allocating thread. When the thread may be a fast allocating thread, process flow moves from step 506 to step 508 in which a determination is made regarding whether memory that was allocated by the thread in the last garbage collection interval exceeds a threshold value. In other words, it is determined whether the amount of memory allocated by the thread since the most recent garbage collection exceeds a threshold amount. Generally, the threshold amount may vary widely depending upon the requirements of the overall system. By way of example, the threshold amount may be in the range of approximately two memory blocks to approximately five memory blocks.

If it is determined in step 508 that the amount of memory allocated by the thread within the last garbage collection interval exceeds the threshold value, then the thread is considered to be a fast allocating thread. Hence, in step 510, the allocation routine of the thread is set to non-locking to indicate that the thread may allocate in its associated block, i.e., its private block, substantially at any time without acquiring a lock, as no other thread may access the block. Once the allocation routine of the thread is set to non-locking, process flow then returns to step 504 and a determination of whether any other threads are to be processed.

If the determination in step 508 is that the amount of memory allocated by the thread in the last garbage collection interval does not exceed the threshold value, then the indication is that the thread is not a fast allocating thread. As such, the thread does not need to hold a private block, and in step 512, the allocation routine of the thread is set to locking. After the allocation routine of the thread is set to locking, process flow returns to step 504 where it is determined whether there is another thread to process.

While assigning private blocks to threads which cause a shared block to overflow is generally effective in allowing fast allocating threads to have private blocks while maintaining a shared block for slow allocating threads, the possibility still exists that a slow allocating thread will be allocated a private block. By way of example, if a thread which rarely allocates objects happens to allocate an object that causes a shared block to overflow, that thread will be allocated a private block which it may never come close to filling up. Accordingly, some methods of allocating blocks of memory may involve "explicit" determinations of whether threads are fast allocating or slow allocating.

Figure 6:
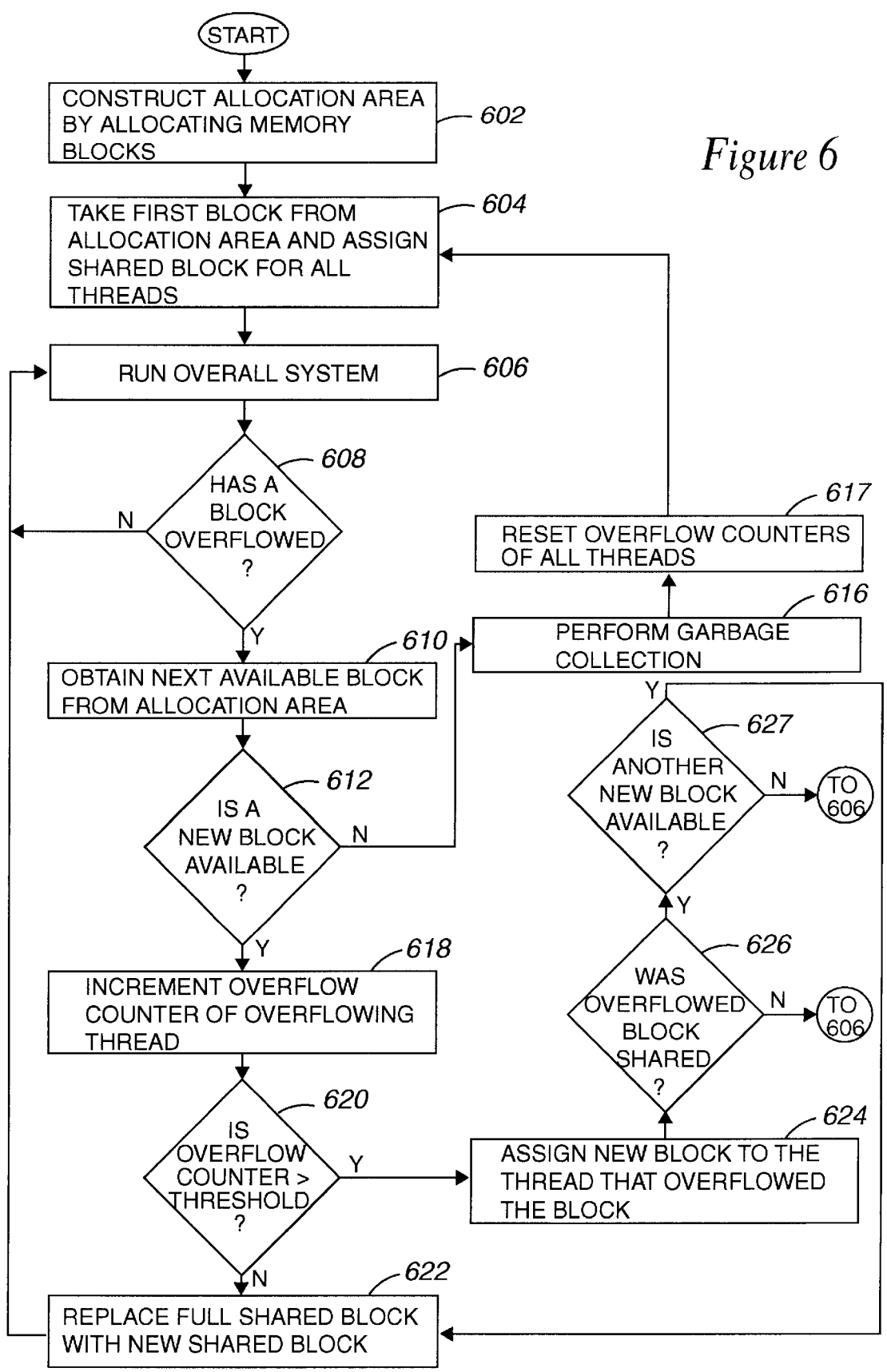
FIG. 6 is a process flow diagram which illustrates the steps associated with a third process of allocating memory in accordance with the first embodiment of the present invention.

In some embodiments, the allocation of a private block from an allocation area to a thread which overflowed a shared block does not occur substantially automatically. By way of example, "statistical indicators" may be used to indicate how many times a thread has caused a shared block to overflow, and, further, to indicate when a thread may be allocated a private block. FIG. 6 is a process flow diagram which illustrates the steps associated with a process of allocating memory such that the assignment of private blocks involves statistical data will be described in accordance with the first embodiment of the present invention. The method of allocating memory begins at step 602 in which a shared memory allocation area is constructed by allocating multiple memory blocks within the shared memory allocation area. Once the memory in the allocation area is divided into blocks, a first block in the allocation area is assigned in step 604 to be a shared block for all threads which may attempt to allocate a new object in the allocation area. Assigning a shared block for all threads allows each thread to allocate new objects in the shared block.

After the shared block is assigned, the overall system is run in step 606. Typically, at some point during the course of running the overall system, the allocation area may be overflowed by a thread which is attempting to create a new object. As mentioned above, the discovery, i.e., discovery by a thread, that a block has overflowed is in effect a determination that a block has overflowed. Hence, a determination is made in step 608 regarding whether a block has overflowed.

When the determination in step 608 is that a block such as the shared block has not overflowed, then the system is allowed to continue running in step 606. Alternatively, when it is determined that a block has overflowed, then process flow proceeds to step 610 where an attempt is made to obtain the next available block from the allocation area. Once the attempt is made to obtain the next available block, then in step 612, a determination is made as to whether a block is available. In other words, a determination is made as to whether there are effectively unused memory blocks available in the allocation area.

When it is determined that there is a new block available, then in step 618, an overflow counter associated with the thread which caused the block to overflow, i.e., the "overflowing thread," is incremented. The overflow counter is arranged to provide an indication, e.g., a statistical indication, of how many times its associated thread has caused a block to overflow. Until a thread has been allocated a private block, its overflow counter effectively identifies the number of times the thread has caused a shared block to overflow. However, once a thread has been allocated a private block, its overflow counter may provide an indication of how many times the thread has caused either a shared block or a private block to overflow.

After the overflow counter of the overflowing thread is incremented in step 618, a determination is made in step 620 regarding whether the overflow counter exceeds a threshold value. In other words, it is determined whether the number of block overflows caused by the thread has exceeded a particular limit. It should be appreciated that the limit, or the threshold value, may generally be widely varied depending upon the requirements of the overall system. If the determination in step 620 is that the overflow counter has not exceeded a threshold value, then process flow moves to step 622 where the full block is replaced with a new shared block. Once a new block has been appropriately assigned, process flow returns to step 606 where the overall system is allowed to run.

When the overflow counter is determined in step 620 to exceed the threshold value, then in step 624, a new block is assigned to the thread that caused the block to overflow in step 608. A determination is then made in step 626 as to whether the overflowed block was a shared block. If it is determined that the overflowed block was not a shared block, then the overall system is allowed to run in step 606. If, however, it is determined that the overflowed block was a shared block, then the implication is that a new shared block may be needed. Accordingly, it is determined in step 627 whether another new block is available for assignment as a shared block.

When no new blocks are available, then process flow returns to step 606 where the system is allowed to run. Without a new shared block, substantially any subsequent attempt by a thread to allocate a new object in the shared block may cause a garbage collection that effectively frees used blocks, as will be discussed below. Alternatively, when another new block is available in step 627, then the full shared block is replaced with a new shared block in step 622.

Returning to step 612, when it is determined that a new block is not available, a garbage collection is performed in step 616. In one embodiment, the garbage collection may involve a generational garbage collection algorithm which may be arranged to copy live objects stored in the blocks of the allocation area into other areas of memory, thereby leaving at least some of the blocks of the allocation area empty for new allocation, as previously described. Once freed, the blocks are typically rendered available for assignment to a specific thread or group of threads.

After the garbage collection is performed in step 616, the overflow counters of substantially all threads associated with the overall system are reset in step 617. Typically, the overflow counters are reset to initial values which indicate that the threads have not overflowed any blocks. From step 617, process flow returns to step 604 where a shared block is assigned for all threads in the overall system.

In general, as described above with respect to FIG. 6, statistical indicators may be used to determine when a thread is to be assigned a private block. The methods in which the statistical indicators are used, however, may generally be widely varied. Another example of the use of statistical indicators such as overflow counters in the allocation of memory will be described with respect to FIG. 7, which generally discusses the use of overflow counters to allow some threads to maintain private blocks after a garbage collection process.

Figure 7:
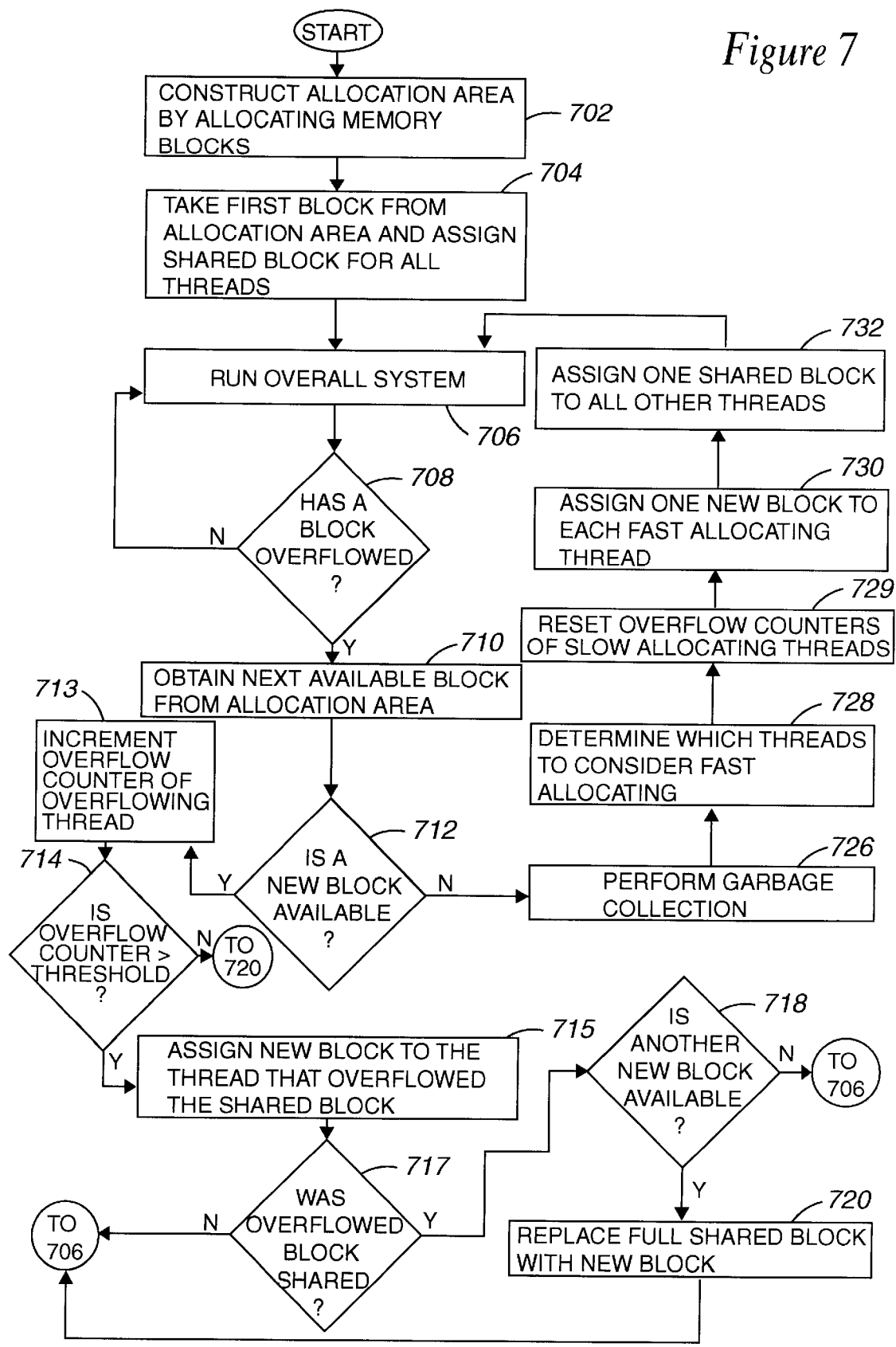
FIG. 7 is a process flow diagram which illustrates the steps associated with a fourth process of allocating memory in accordance with the first embodiment of the present invention.

FIG. 7 is a process flow diagram which illustrates the steps associated with another process of allocating memory that involves statistical indicators in accordance with the first embodiment of the present invention. The method of allocating memory begins at step 702 in which a shared memory allocation area is constructed by allocating multiple memory blocks within the shared memory allocation area. Once the memory in the allocation area is divided into blocks, a first block in the allocation area is assigned in step 704 to be a shared block for all threads which may attempt to allocate a new object in the allocation area.

After the shared block is assigned, the overall system is run in step 706. That is, threads are allowed to attempt to allocate new objects. At some point during the course of running the overall system, the allocation area may be overflowed by a thread which is attempting to create a new object. As the discovery, i.e., discovery by a thread, that a block has overflowed is essentially a determination that a block has overflowed, a determination is made in step 708 regarding whether a block has overflowed.

Effectively, until the determination in step 708 is that a block, e.g., the shared block, has overflowed, the system is allowed to continue running in step 706. When it is determined that a block has overflowed, then process flow proceeds from step 708 to step 710 where an attempt is made to obtain the next available block from the allocation area. Once the attempt is made to obtain the next available block, a determination is made in step 712 as to whether a block is available.

When it is determined that there is a new block available, an overflow counter associated with the thread which caused the block to overflow, i.e., the overflowing thread, is incremented in step 713. The overflow counter, as discussed above with reference to FIG. 6, is generally arranged to identify the number of times its associated thread has caused a block to overflow.

After the overflow counter of the overflowing thread is incremented in step 713, a determination is made in step 714 regarding whether the overflow counter is greater than a predetermined threshold value. The predetermined threshold value us generally used to determine whether a thread is to be assigned a private block. When it is determined that the overflow counter is less than the threshold value, process flow moves to step 720 where the full shared block is replaced with a new block, i.e., a new shared block. Once the full shared block is replace, the overall system is allowed to continue running in step 706.

If it is determined in step 714 that the overflow counter exceeds a threshold value, then in step 715, a new block is assigned to the thread that overflowed the block as determined in step 708. Once the new block is assigned to the thread or, more specifically, the overflowing thread, such that it is a private block, a determination is made in step 717 as to whether the overflowed block was a shared block. If it is determined that the overflowed block is not a shared block, then process flow returns to step 706 where the overall system is allowed to run. It should be appreciated that the overflowed block will generally be a shared block until the overall system has been allowed to run after private blocks have been assigned. After private blocks have been assigned, then the overflowed block may be either a shared block or a private block.

Alternatively, if the determination in step 717 is that the overflowed block is a shared block, then the indication is that the overflowed shared block should preferably be replaced, if possible. Accordingly, a determination is made in step 718 regarding whether an additional new block is available. If it is determined that additional new block is available, the overflowed shared block is replaced with the additional new block in step 720. Then, process flow moves to step 706 in which the overall system is allowed to run. On the other hand, when the determination in step 718 is that no additional new block is available, then process flow returns directly to step 706 where the overall system is allowed to run.

Returning to step 712, when a new block is determined not to be available after a block has overflowed, a garbage collection is performed in step 726. After the garbage collection is performed in step 726, the threads which are considered to be fast allocating are determined in step 728. In one embodiment, determining which threads are considered to be fast allocating involves a comparison of the overflow counters of the threads to identify the threads with overflow counters which exceed a particular limit. Alternatively, in another embodiment, the threads considered to be fast allocating may be a predetermined number of threads which have the highest overflow counters of all threads.

After the threads which are considered to be fast allocating are identified in step 728, the overflow counters of the slow allocating threads, i.e., the threads which are not considered to be fast allocating, are reset in step 729. Resetting the overflow counters of slow allocating threads may serve to protect against any subsequent allocation of private blocks to threads which may not need the private blocks. Generally, the overflow counters are reset to initial values which indicate that the threads have not overflowed any blocks. In step 730, a new block is assigned to each fast allocating thread. That is, a private block is assigned to each fast allocating thread. Once a new block is assigned to each fast allocating thread, a shared block is assigned to all other threads, i.e., the slow allocating threads, in step 732. When all threads have been assigned to either a private block or a shared block, process flow returns to step 706 where the overall system is allowed to run.

Allowing memory blocks to be shared by multiple slow-allocating threads, while allowing fast-allocating threads to have access to private memory blocks, generally serves to reduce the amount of memory which is wasted, or is reserved but not filled, at garbage collection time. The sharing of memory blocks also serves to reduce the frequency of garbage collection performed, as more memory is likely to be filled before a garbage collection is performed. Another method of allocating memory blocks which generally reduces wasted memory, as well as the frequency of garbage collection, involves creating memory blocks of different sizes, and allocating the memory blocks to threads based on the requirements of the threads. Using such a method, synchronization costs associated with attempting to allocate objects in shared blocks may effectively be eliminated.

Second Embodiment

Figure 8:
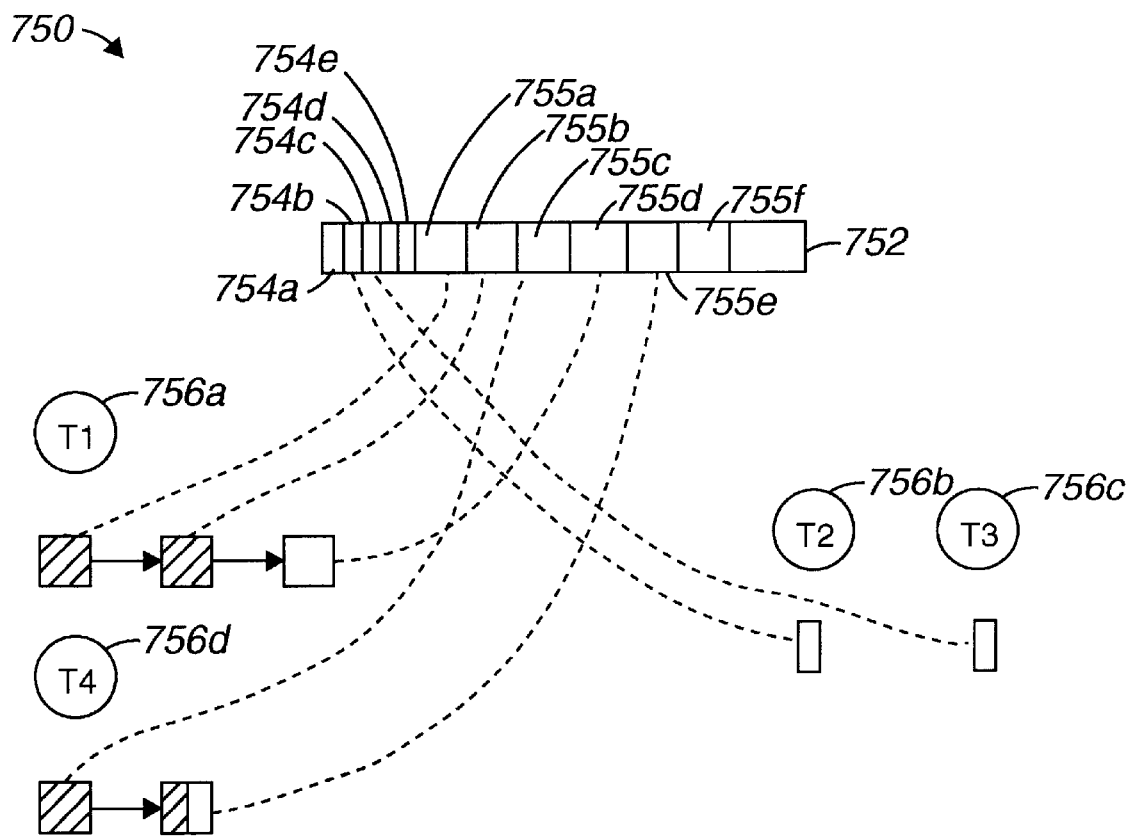
FIG. 8 is a diagrammatic representation of multiple threads and a memory allocation area shared by the multiple threads in accordance with a second embodiment of the present invention.

A shared memory area that is divided into memory blocks of different sizes, and several methods for allocating the blocks to different threads, will be discussed below with reference to FIGS. 8, 9, 10a, 10b, and 11. FIG. 8 is a diagrammatic representation of multiple threads and a memory allocation area that is shared by the multiple threads and divided into blocks of different sizes in accordance with a second embodiment of the present invention. A multi-threaded computing environment 750 includes a shared memory allocation area 752 and multiple threads 756. Memory allocation area 752 is segmented into blocks 754, 755 of different sizes. In the described embodiment, blocks 754 are all of substantially one size, while blocks 755 are all of substantially another size such that blocks 755 are larger than blocks 754. It should be appreciated, however, that memory allocation area 752 may generally include more than two groups of blocks that are of different sizes.

The size of memory allocation area 752 may vary depending upon factors which include, but are not limited to, the requirements of environment 750. For example, if environment 750 has an associated Java™ virtual machine, memory allocation area 752 may have a size which ranges from approximately 128 kB to approximately 512 kB. Similarly, the size of blocks 754, 755 may also vary widely. In one embodiment, blocks 754 may be significantly smaller than blocks 755, e.g., blocks 754 may be in the range of approximately 1 kB to 4 kB each in size while blocks 755 may be in the range of approximately 16 kB to approximately 32 kB each in size. As mentioned above, in environment 750, all blocks 754 may be approximately equal in size, while all blocks 755 may be approximately equal in size, such that memory allocation area 752 effectively includes blocks of two different sizes.

Within environment 750, fast allocating threads 756, e.g., threads 756a and 756d, are each eventually allocated private blocks 755, as blocks 755 are larger than blocks 754. Slow allocating threads 756b, 756c, on the other hand, are each allocated private blocks 754. In general, by assigning smaller blocks 754 to slow allocating threads 756b, 756c, less memory space is wasted, as blocks 754 are more likely to be filled at garbage collection time. Additionally, by assigning larger blocks 755 to fast allocating threads 756a, 756d, or threads which allocate a relatively large amount of bytes, fast allocating threads 756a, 756d are allowed to have more access to memory space, thereby potentially decreasing the frequency of garbage collection.

Assigning smaller blocks 754 to slow, or low, allocating threads 756b, 756c, may also reduce issues associated with false sharing which may occur in an environment such as environment 750, namely a multi-threaded, multi-processor environment. False sharing, as will be appreciated by those skilled in the art, generally occurs when two objects are allocated in a single cache line, and each of them is frequently written by a single thread, i.e., one thread writes one object and another thread writes the other object. Such a situation may lead to relatively expensive remote cache misses. If each thread 756 has its own block 754, 755, false sharing may be reduced as long as the thread that is allocating an object is the most frequent writer of a particular object.

Figure 9:
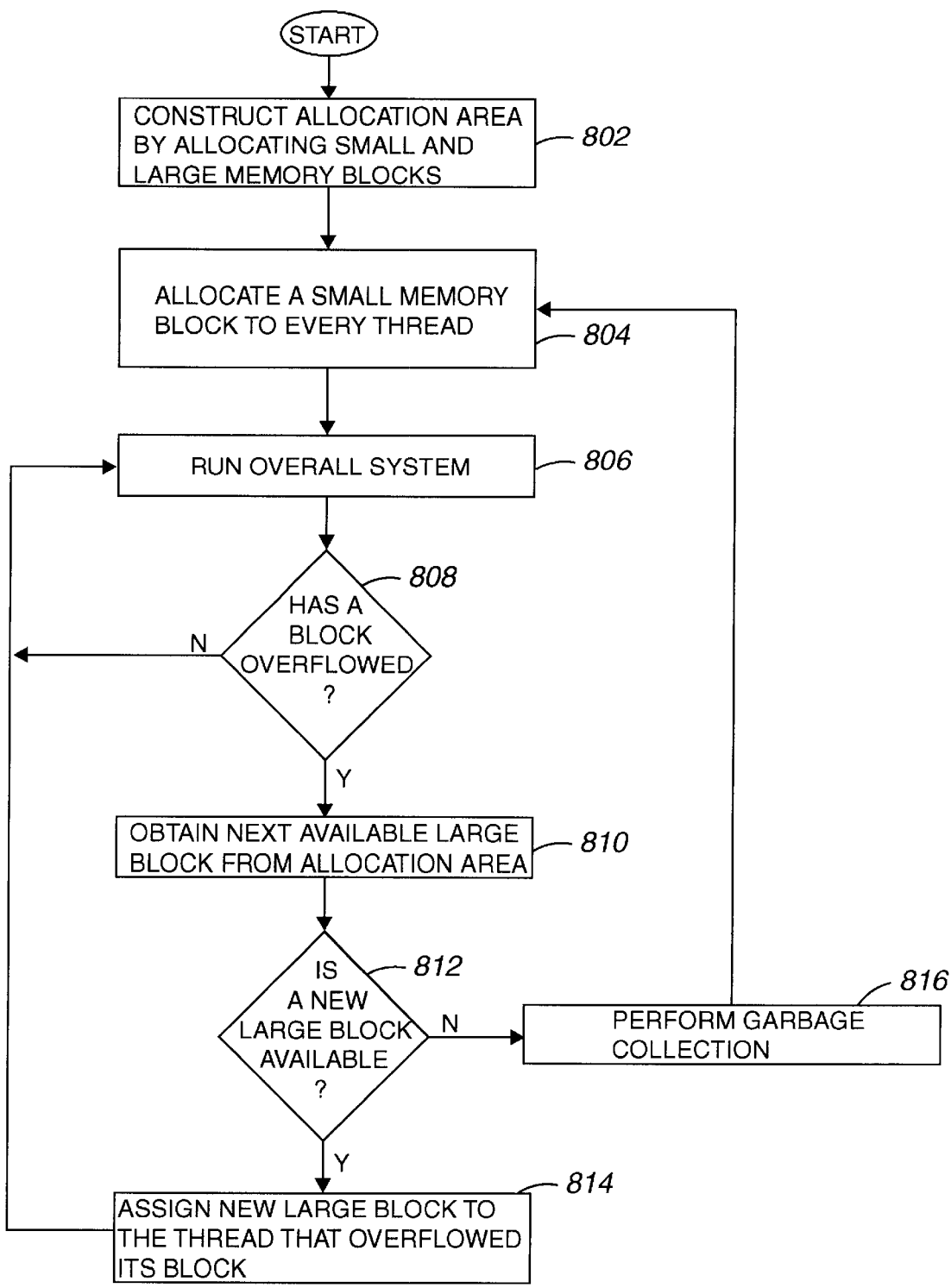
FIG. 9 is a process flow diagram which illustrates the steps associated with a first process of allocating memory in accordance with the second embodiment of the present invention.

In one embodiment, before potentially fast allocating threads may be assigned large private blocks, the potentially fast allocating threads are first identified. FIG. 9 is a process flow diagram which illustrates the steps associated with a first process of allocating memory in accordance with the second embodiment of the present invention. The process begins at step 802 where an allocation area is effectively constructed by allocating both small and large memory blocks. The number of small blocks and the number of large blocks may vary widely, and may be dependent on factors which include, but are not limited to, the anticipated requirements of the overall system. In general, the number of small blocks may be such that there is at least one small block for every thread associated with the overall system.

Although the size of the memory blocks may be widely varied, as discussed above with reference to FIG. 8, in one embodiment, the large memory blocks are typically at least ten times the size of the small memory blocks. By way of example, a small memory block may be approximately 2 kB in size, while a large memory block may be approximately 32 kB in size. Generally, the small memory blocks may be sized such that they are a power of two smaller than the large memory blocks to enable large memory blocks to be readily divided into small memory blocks, if desired.

After the small and large memory blocks are allocated in step 802, then small memory blocks are assigned, or allocated, to every thread in step 804. That is, small memory blocks are assigned as private blocks for every thread. Once a small memory block is assigned to each thread, the overall system is allowed to run in step 806. As the overall system runs, threads attempt to allocate new objects in their associated private blocks. Typically, during the course of running the system, a thread attempting to allocate a new object will overflow its private block.

Typically, the discovery by a thread that its private block has overflowed is effectively a determination that a block has overflowed. Hence, until a determination is made in step 808 that a block has overflowed, the overall system continues to run in step 806. When it is determined in step 808 that a block has overflowed, the indication is that the thread that caused the block to overflow is potentially a fast allocating thread. Accordingly, an attempt is made in step 810 to obtain the next available large block from the allocation area.

A determination is made in step 812 regarding whether a new large block was successfully obtained, i.e., available, in step 810. If it is determined that a new large block is available, the new large block is assigned to the thread that overflowed its block in step 814. Once the new large block is assigned, process flow returns to step 806 where the overall system is allowed to run.

Alternatively, when it is determined in step 812 that a new large block is not available, in the described embodiment, a garbage collection is performed in step 816. The garbage collection, e.g., the generational garbage collection, is performed to free memory blocks, as described above. The garbage collection generally removes associations between threads and private blocks. In other words, when a garbage collection is completed, threads in the overall system no longer have blocks assigned to them. Therefore, after the garbage collection is performed, process flow moves to step 804 where a small memory block is allocated to each thread.

While assigning a small block to each thread after a garbage collection process may be effective, other processes may be used to determine the size of blocks to be assigned to each thread after a garbage collection process. For instance, in lieu of assigning a small block to each thread after a garbage collection process, blocks may be assigned based on the likely requirements of each thread. By keeping track of whether a thread had a private block that was a large block prior to a garbage collection process, if it is determined that the thread is a fast allocating thread and is likely to need a large block, a new large block may be assigned to the thread. Assigning large private blocks to threads which are expected to allocate a relatively large volume of new objects may reduce the number of times blocks in an overall system overflow, thereby increasing the efficiency of the system.

Figure 10A:
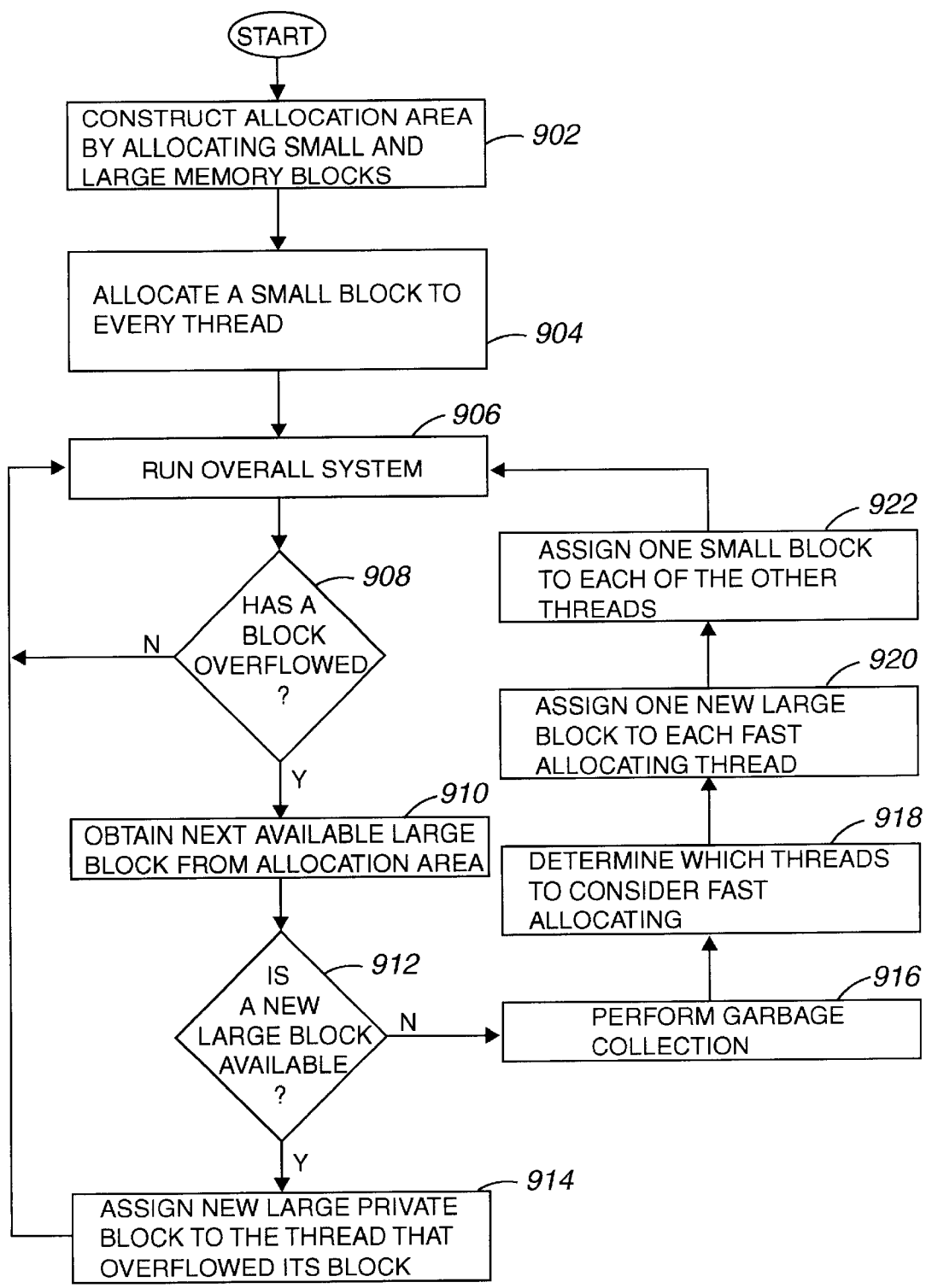
FIG. 10a is a process flow diagram which illustrates the steps associated with a second process of allocating memory in accordance with the second embodiment of the present invention.

FIG. 10a is a process flow diagram which illustrates the steps associated with a process of allocating memory which involves assigning blocks to threads based upon the allocation speed of the threads in accordance with the second embodiment of the present invention. The process begins at step 902 where an allocation area is constructed by allocating memory blocks of a small size and memory blocks of a large size. The number of small blocks and the number of large blocks may vary widely, and may be dependent on factors which include, but are not limited to, the anticipated requirements of the overall system. In general, the number of small blocks may be such that there is at least one small block for every thread associated with the overall system.

Small memory blocks are assigned, or allocated, to every thread in step 904 after the small and large memory blocks are allocated in the allocation area. Once each thread has been assigned a private small memory block, the overall system is allowed to run in step 906. While the overall system is in the process of running, threads attempt to allocate new objects in their associated private blocks. At some point during the course of running the system, a thread attempting to allocate a new object may overflow its private block.

The discovery by a thread that its private block has overflowed is effectively a determination that a block has overflowed. Therefore, until a determination is made in step 908 that a block has overflowed, the overall system continues to run in step 906. When it is determined in step 908 that a block has overflowed, an attempt is made in step 910 to obtain the next available large block from the allocation area.

After an attempt is made to obtain the next available large block from the allocation area, a determination is made in step 912 regarding whether a new large block is available. If it is determined that a new large block is available, the new large block is assigned to the thread that overflowed its block in step 914, and process flow returns to step 906 where the overall system is allowed to run.

Alternatively, if it is determined in step 912 that a new large block is not available, in the described embodiment, a garbage collection is performed in step 916. The garbage collection, which may be a generational garbage collection, is performed to free memory blocks, and generally removes associations between threads and private blocks. In the described embodiment, during the garbage collection, information concerning whether a particular thread was associated with a large block or a small block may be maintained.

Once the garbage collection is performed, the threads which are considered to be fast allocating threads are identified in step 918. The steps associated with identifying fast allocating threads may generally be widely varied, and may be dependent upon factors that include, but are not limited to, the requirements of the particular system. One method of determining which threads are to be considered as fast allocating threads will be described below with reference to FIG. 10*b*.

Each identified fast allocating thread is assigned a new large block in step 920. In other words, each fast allocating thread is allocated a private large block. Then, in step 922, a small block is assigned to each of the remaining threads, e.g., the slow allocating threads. After every thread has been assigned a private block, process flow returns to step 906 where the overall system is allowed to run.

Figure 10B:
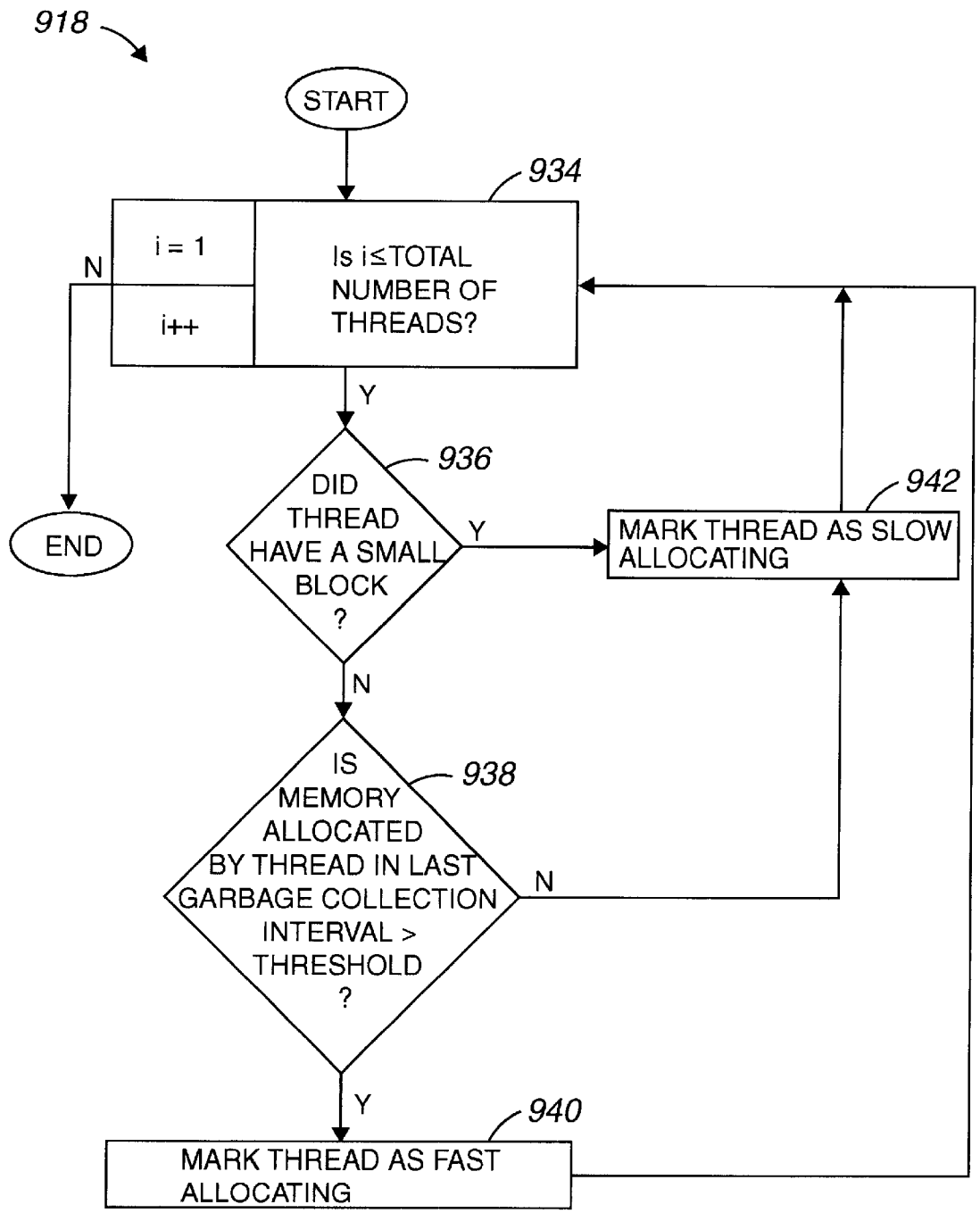
FIG. 10b is a process flow diagram which illustrates the steps associated with a determination of which threads are considered to be fast allocating threads, i.e., step 918 of FIG. 10a, in accordance with the second embodiment of the present invention.

Referring next to FIG. 10*b*, one method of identifying threads that are considered to be fast allocating will be described. FIG. 10*b* is a process flow diagram which illustrates the steps associated with a determination of which threads are considered to be fast allocating threads, i.e., step 918 of FIG. 10*a*, in accordance with the second embodiment of the present invention. The process of determining which threads may be considered to be fast allocating threads begins at step 934, which is effectively a determination of whether there is a thread to be "tested" in order to identify whether it may be considered to be a fast allocating thread. If there is no thread to be tested, the process of determining whether threads are fast allocating or slow allocating is completed. Alternatively, if there is a thread to be tested, a determination is made in step 936 as to whether the thread was assigned a small private block.

If the determination is that the thread was assigned a small private block, then the indication is that the thread is a slow allocating thread, as the thread did not previously need a large private block. When the indication is that the thread is to be considered as a slow allocating thread, the thread is marked as a slow allocating thread in step 942. After the thread is identified as slow allocating, process flow returns to step 934 and the determination of whether there is another thread to be processed.

Alternatively, if it is determined in step 936 that the thread was not assigned a small private block, then the indication is that the thread was assigned a large private block and, therefore, may be a fast allocating thread. When the thread may be a fast allocating thread, a determination is made in step 938 regarding whether the amount of memory that was allocated by the thread in the last garbage collection interval exceeds a threshold amount. A garbage collection interval, in one embodiment, is the time that elapsed between the most recent garbage collection and the garbage collection prior to the most recent garbage collection. Information relating to a garbage collection interval may generally be accumulated and stored in overall system memory as necessary. As such, step 938 basically involves a determination of whether the amount of memory allocated by the thread since the most recent garbage collection exceeds a threshold amount, which may be widely varied depending upon the requirements of the overall system.

If the determination in step 938 is that the memory allocated by the thread within the last garbage collection interval exceeds the threshold value, then the thread is considered to be a fast allocating thread. When the thread is considered to be fast allocating, the thread is marked as fast allocating in step 940. Once the thread is marked, or otherwise identified, as a fast allocating thread, process flow then returns to step 904 and a determination of whether any other threads are to be processed.

On the other hand, if the determination in step 938 is that the amount of memory allocated by the thread in the last garbage collection interval is less than the threshold value, then the indication is that the thread is not a fast allocating thread. As a result, the thread is marked as a slow allocating thread in step 942. After the thread is marked as a slow allocating thread, process flow returns to step 934 where it is determined whether there is another thread to process.

Figure 11:
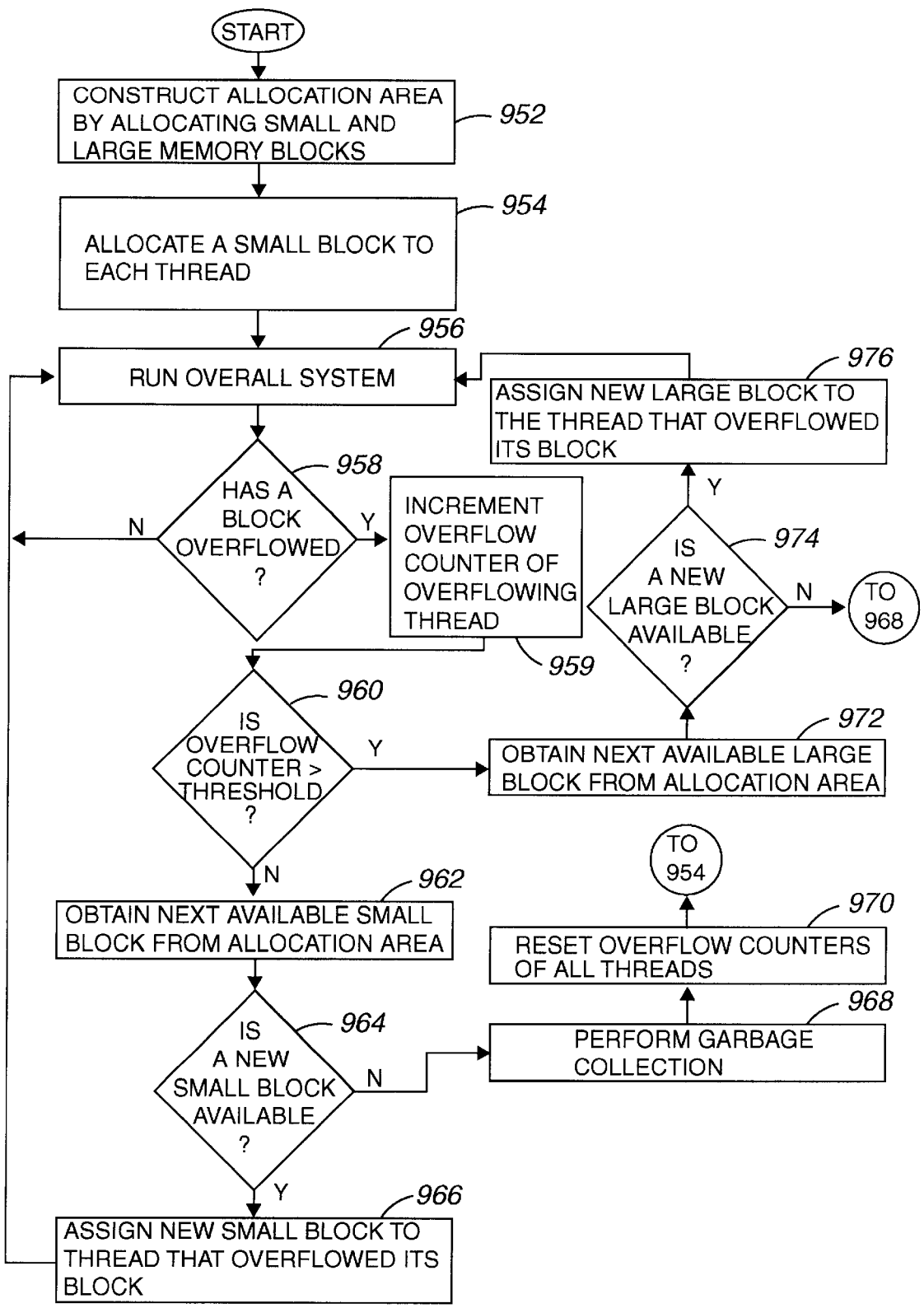
FIG. 11 is a process flow diagram which illustrates the steps associated with a third process of allocating memory in accordance with the second embodiment of the present invention.

Instead of using a diagnostic such as the amount of memory allocated by a thread in a given time period to determine whether a thread which overflowed its block should be allocated a large memory block or a small memory block, the determination of which size block the thread should be allocated may be based on other factors. By way of example, such a determination may be based on the number of times the thread has overflowed a private block. Referring next to FIG. 11, the steps associated with a third process of allocating memory, which uses overflow counters, will be described in accordance with the second embodiment of the present invention. The process begins at step 952 in which a memory allocation area is constructed essentially by allocating memory blocks of different sizes, e.g., a small size and a large size. Once the small and large memory blocks are allocated, a small block is assigned in step 954 to each thread in the overall system. That is, each thread in the system is assigned a private small block.

After each thread has been assigned a private small block, the overall system is allowed to run in step 956. While the overall system is in the process of running, threads attempt to allocate new objects in their associated private blocks. During the course of running the system, a thread attempting to allocate a new object in its private block may overflow its private block. In general, the discovery by a thread that its private block has overflowed is essentially equivalent to a determination that a block in the overall system has overflowed. Hence, until a determination is made in step 958 that a block has overflowed, the overall system continues to run in step 956. When it is determined in step 958 that a block has overflowed, the overflow counter of the thread which caused the block to overflow is incremented in step 959.

In the described embodiment, the overflow counter of a thread is arranged to indicate the number of times the thread has caused an associated private block to overflow. Once the overflow counter of the overflowing thread is incremented, a comparison is made in step 960 in order to determine whether the overflow counter of the overflowing thread exceeds a threshold value, i.e., a specified limiting value. It should be appreciated that the threshold value may be widely varied depending upon the overall system requirements. However, typically, the threshold value is set such that threads with overflow counters which exceed the threshold value have the tendency to allocate many objects.

When it is determined in step 960 that the overflow counter of the overflowing thread does not exceed the threshold value, then the indication is that the overflowing thread is not likely to be a fast allocating thread and, hence, is not likely to require a large block. Accordingly, an attempt is made in step 962 to obtain a new small block from the allocation area. A determination is made in step 964 regarding whether the attempt to obtain a new small block from the allocation area was successful. If a new small block was successfully obtained, the new small block is assigned to the thread that overflowed its block in step 966. Then, process flow returns to step 956 where the overall system is allowed to continue to run.

Alternatively, if the determination in step 964 is that no new small block is available, a garbage collection such as a generational garbage collection is performed in step 968. After the garbage collection is performed to free memory associated with the small and large blocks, the overflow counters for all threads are reset in step 970 to an initial value. In general, the initial value is arranged to indicate that a thread has not caused a block to overflow. Once the overflow counters are reset, process flow returns to step 954 where a private small block is allocated to each thread.

Returning to step 960, when the overflow counter of the overflowing thread is determined to exceed the threshold value, then the indication is that the overflowing thread is likely to be considered a fast allocating thread. Therefore, an attempt is made in step 972 to obtain the next available large block from the memory allocation area. Once the attempt is made to obtain a new large block, a determination is made as to whether a new large block is available in step 974. If it is determined that a new large block is available, the new large block is assigned to the overflowing thread in step 976, and the overall system is allowed to run in step 956. Alternatively, if it is determined in step 974 that no large block is available, then process flow proceeds to step 968 where a garbage collection is performed to free memory.

Computer System and Virtual Machine

Figure 12:
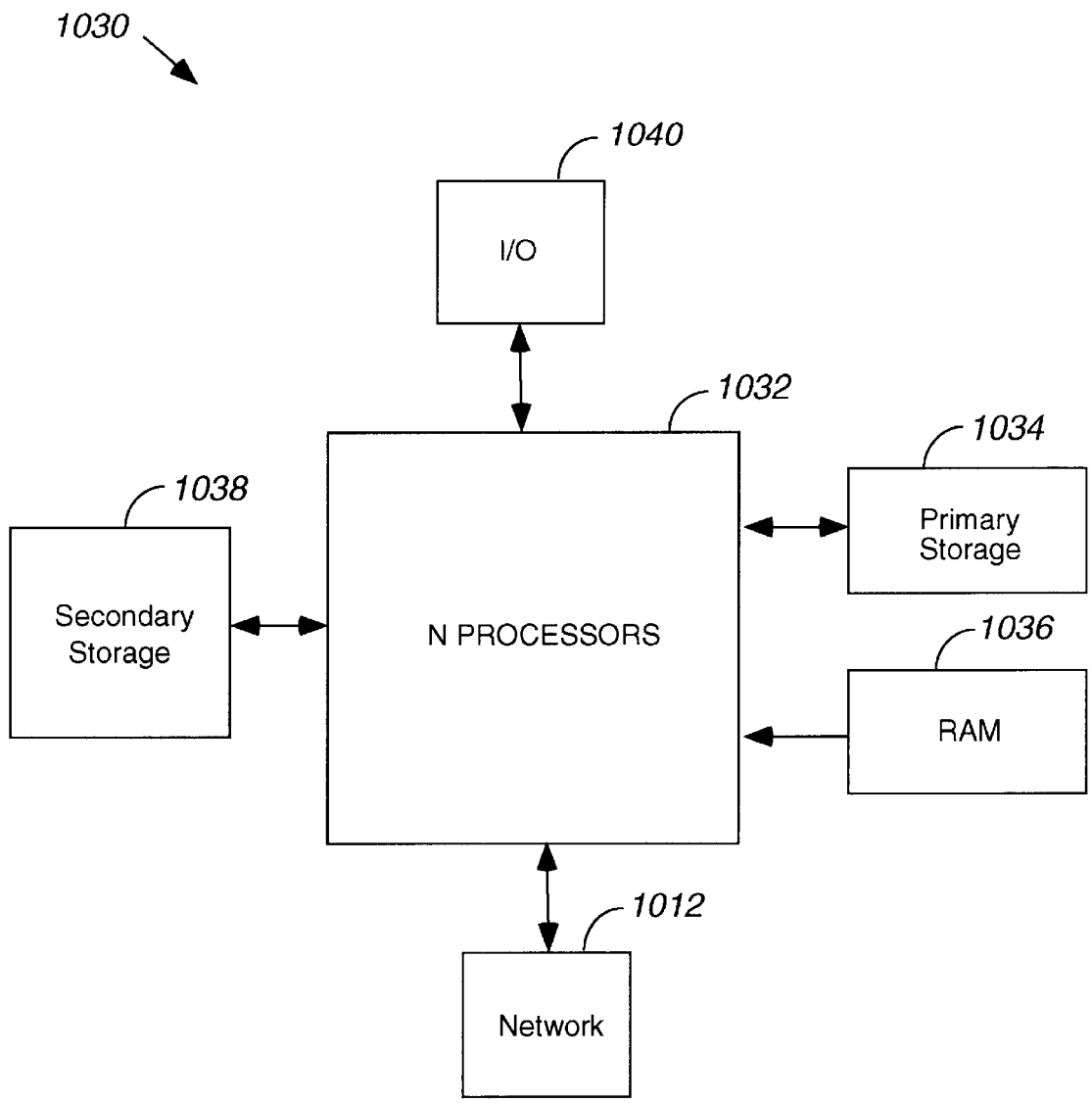
FIG. 12 illustrates a typical, general-purpose computer system suitable for implementing the present invention.

The present invention may generally be implemented on any suitable computer system. FIG. 12 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM).

Computer system 1030 or, more specifically, CPUs 1032, may be arranged to support a virtual machine, as will be appreciated by those skilled in the art. One example of a virtual machine that is supported on computer system 1030 will be described below with reference to FIG. 13. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 13:
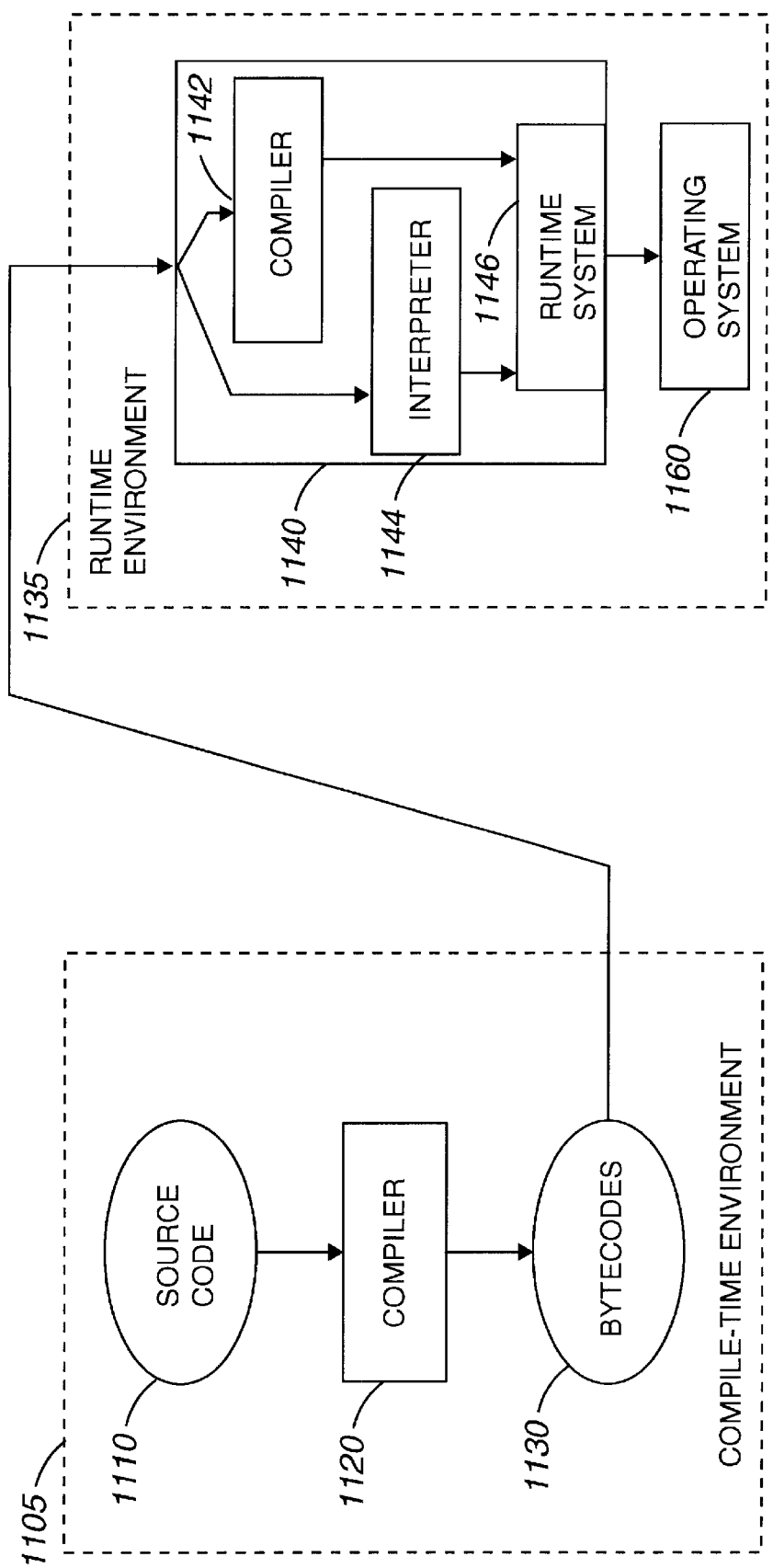
FIG. 13 is a diagrammatic representation of a virtual machine which is supported by computer system 1030 of FIG. 12, and is suitable for implementing the present invention.

As previously mentioned, a virtual machine may execute on computer system 1030. FIG. 13 is a diagrammatic representation of a virtual machine which is supported by computer system 1030 of FIG. 12, and is suitable for implementing the present invention. When a computer program, e.g., a computer program written in the Java™ programming language (developed by Sun Microsystems, Inc.), is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 12, or stored on a storage device such as primary storage 1034 of FIG. 12. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 12. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Variations and Extensions

Although only a few embodiments of the present invention have been described, it should be understood that the present invention may be embodied in many other specific forms without departing from the spirit or scope of the invention. By way of example, steps involved with allocating memory space, both in a system in which memory space is divided into substantially equal blocks and in a system in which memory space is divided into different sized blocks, may be reordered. Steps may also generally be altered, removed, or added as desired.

While the determination of whether a thread is to be assigned a private block, or a large private block in a system which includes both small and large private blocks, may effectively be based upon the number of bytes allocated by the thread, it should be appreciated that such a determination may be based on a variety of different factors. By way of example, when a thread is arranged to allocate a single large object at a relatively low frequency, that thread may not be allocated a private block, since the synchronization overhead associated with the low frequency allocation of the large object in a shared block may be insignificant. Alternatively, the number of object allocations performed by a thread may also be used in the determination of which threads are assigned private blocks.

The assignment of private memory blocks to threads which are considered to be fast allocating after a garbage collection has been described in terms of assigning a new block to each fast allocating thread. It should be appreciated, however, that the assignment of private blocks to fast allocating threads may not necessarily be "global." In other words, not all threads which are considered to be fast allocating may be assigned private blocks. By way of example, in the event that there are not enough memory blocks to allow for each fast allocating thread to be associated with its own block, private blocks may be assigned to only the "fastest" of the fast allocating threads without departing from the spirit or the scope of the present invention.

The use of shared blocks has generally been described in terms of a shared block being initially assigned to all threads associated with a multi-threaded system. In one embodiment, however, rather than initially assigning a single shared block to all threads, groups of threads may be assigned to a specific shared block. That is, there may be more than one shared block in a particular system. The determination of how many shared blocks are to be used may depend upon factors which include, but are not limited to, the relative cost of synchronization as compared to the relative cost of garbage collection.

While the use of shared blocks, i.e., blocks that are shared by many threads, has been described in terms of a memory allocation area in which all blocks are of substantially the same size, it should be appreciated that shared blocks may also be used in a system in which the blocks are of different sizes without departing from the spirit or the scope of the present invention. For example, when a memory allocation area is divided into small and large blocks, a shared block may either be a small block or a large block. The determination of whether the shared block should be a small block or a large block may be dependent upon factors which may include, but are not limited to, the anticipated requirements of particular computing systems. When the shared block overflows, in some embodiments, the overflowing thread may initially be assigned a private small block. Then, if the overflowing thread is ultimately determined to be a fast allocating thread, the overflowing thread may then be assigned a private large block.

When a memory allocation area is divided into blocks of a small size and a large size, an unsuccessful attempt to obtain a large block may result in a garbage collection, as discussed above with reference to FIGS. 9, 10*a*, and 11. In one embodiment, however, when a large block is unavailable, an attempt may be made to obtain a small block. If a small block is available, the small block may be assigned to an overflowing thread. However, if no small block is available, then a garbage collection may be performed. By first attempting to obtain a small block before performing a garbage collection, the frequency of garbage collections may be reduced, thereby potentially increasing system efficiency.

Similarly, when an attempt made to obtain a small block in a system which has memory blocks of small and large sizes is unsuccessful, an attempt may be made to obtain a large block before resorting to a garbage collection. When a large block is available, the large block may be assigned to an overflowing thread. By assigning a large block to an overflowing thread when no small blocks are available, a garbage collection may be delayed until no blocks are available. Alternatively, when no small blocks are available, a large block may be split up to create new small blocks which may then be assigned. As garbage collections generally have a relatively high overhead, delaying garbage collections may result in the need for fewer garbage collections. Hence, overall system efficiency may be improved.

Although the use of an overflow counter to determine which size block to assign to a thread in a system which includes both small blocks and large blocks has been described in terms of comparing a single overflow counter to a single threshold, a thread may generally include any number of overflow counters. By way of example, a thread may include an overflow counter which identifies the number of times the thread has overflowed a small block, as well as an overflow counter which identifies the number of times the thread has overflowed a large block. For a thread with two overflow counters, different thresholds may be implemented in the determination of the size of any new block that is to be assigned to the thread.

The allocation of blocks of different sizes within an allocation area has generally been described in terms of allocating blocks of a small size and blocks of a large size. Specifically, the allocation of blocks of different sizes has been described in terms of an allocation area which includes blocks of two different sizes. It should be appreciated, however, that in some embodiments, blocks of more than two different sizes may be allocated within an allocation area without departing from the spirit or the scope of the present invention. For example, an allocation area may include small, large, and intermediate size memory blocks which may be assigned to different threads depending upon the requirements of each thread.

The present invention has been described in terms of usage as a part of a multi-threaded virtual machine such as a Java™ Virtual Machine. However, the present invention may generally be implemented with respect to substantially any suitable virtual machine. Therefore, the present examples are to be considered as illustrative and not restrictive, and the invention is not to be limited to the details given herein, but may be modified within the scope of the appended claims.

What is claimed is:

1. A method for allocating memory shared by multiple threads in a multi-threaded computing system, the method comprising:

partitioning the shared memory into a plurality of blocks;

grouping the multiple threads into at least a first group of threads and a second group of threads, wherein the first group is configured to contain a plurality of fast allocating threads; and allocating a first block selected from the plurality of blocks to a thread selected from the multiple threads, the selected thread being arranged to attempt to allocate an object in the selected first block, wherein allocation of the selected first block to the selected thread is based at least partially upon whether the selected thread is a part of the first group or the second group.

2. A method for allocating memory shared by multiple threads as recited in claim 1 wherein grouping the multiple threads into the first group and the second group includes:

identifying a particular thread selected from the multiple threads; and determining whether the particular thread is a fast allocating thread, wherein when it is determined that the particular thread is fast allocating, the particular thread is grouped into the first group.

3. A method for allocating memory shared by multiple threads as recited in claim 1 wherein partitioning the shared memory into a plurality of blocks includes partitioning the shared memory into a plurality of blocks of at least two different sizes.

4. A method for allocating shared memory in a multi-threaded computing system, the multi-threaded computing system including at least a first thread and a second thread, the method comprising:

partitioning the shared memory into a plurality of blocks, assigning a first block selected from the plurality of blocks as a block which is accessible to both the first thread and the second thread, wherein the first thread is arranged to attempt to allocate a first object in the first block and the second thread is arranged to attempt to allocate a second object in the first block;

determining when the first block has overflowed;

determining whether an attempt by the first thread associated with a first group of multiple threads to allocate the first object in the first block caused the first block to overflow when it is determined that the first block has overflowed; and assigning a second block selected from the plurality of blocks to the first thread when it is determined that the attempt by the first thread to allocate the first object in the first block caused the first block to overflow, wherein assigning the second block to the first thread is arranged to associate the first thread as a fast allocating thread and cause the first thread to no longer attempt to allocate objects in the first block.

5. A method as recited in claim 4 wherein the second thread is not arranged to attempt to allocate objects in the second block.

6. A method as recited in claim 4 further including:

determining when one of the first block and the second block have overflowed;

assigning a third block selected from the plurality of blocks to the first thread when it is determined that the second block overflowed; and assigning the third block to the second thread when it is determined that the first block overflowed.

7. A method as recited in claim 6 wherein when it is determined that the first block overflowed, the method further includes assigning a fourth block selected from the plurality of blocks to replace the first block.

8. A method as recited in claim 4 wherein blocks in the plurality of blocks are all of substantially the same size.

9. A method for allocating shared memory in a multi-threaded computing system, the multi-threaded computing system including at least a first thread and a second thread, the method comprising:

partitioning the shared memory into multiple blocks, the multiple blocks including a plurality of blocks of a first size configured for slow allocating threads and at least one block of a second size;

assigning a first block selected from the plurality of blocks of the first size to the first thread wherein the first thread is arranged to attempt to allocate a first object in the first block;

assigning a second block selected from the plurality of blocks of the first size to the second thread, wherein the second thread is arranged to attempt to allocate a second object in the second block;

determining when one of the first block and the second block has overflowed;

determining whether a third block of the second size is available;

assigning the third block to the first thread when it is determined that the third block is available and when it is determined that the first block has overflowed; and assigning the third block to the second thread when it is determined that the third block is available and when it is determined that the second block has overflowed.

10. A method as recited in claim 9 wherein the first thread is not arranged to attempt to allocate objects in the second block and the second thread is not arranged to attempt to allocate objects in the first block.

11. A method as recited in claim 9 wherein the plurality of blocks of the first size have a larger size than the at least one block of the second size.

12. A multi-threaded computer system including memory, a first thread, and a second thread, the memory being accessible to both the first thread and the second thread, the computer system being arranged to allocate the memory, the computer system comprising:

a first processor associated with the first thread, the first thread corresponding to one of a plurality of threads in a first group of fast allocating threads;

a memory partitioner arranged to partition the memory into a plurality of blocks;

a block assigned to assign a first block selected from the plurality of blocks as a block which is accessible to both the first thread and the second thread, wherein the first thread is arranged to attempt to allocate a first object in the first block and the second thread is arranged to attempt to allocate a second object in the first block;

a first determination mechanism arranged to determine when the first block has overflowed;

a second determination mechanism arranged to determine whether an attempt by the first thread to allocate the first object in the first block caused the first block to overflow when it is determined that the first block has overflowed; and a second block assigner arranged to assign a second block selected from the plurality of blocks to the first thread when it is determined that the attempt by the first thread to allocate the first object in the first block caused the first block to overflow, wherein assigning the second block to the first thread is arranged to cause the first thread to no longer attempt to allocate objects in the first block.

13. A multi-threaded computer system as recited in claim 12 further including:

a third determination mechanism arranged to determine when one of the first block and the second block have overflowed; and a third block assigner arranged to assign a third block selected from the plurality of blocks to the first thread when it is determined that the second block overflowed, wherein the third block assigner is further arranged to assign the third block to the second thread when it is determined that the first block overflowed.

14. A computer program product for allocating shared memory in a multi-threaded computing system, the multi-threaded computing system including at least a first thread and a second thread, the computer program product comprising:

computer code for partitioning the shared memory into a plurality of blocks;

computer code for assigning a first block selected from the plurality of blocks as a block which is accessible to both the first thread and the second thread, wherein the first thread is arranged to attempt to allocate a first object in the first block and the second thread is arranged to attempt to allocate a second object in the first block, the first thread corresponding to one of a plurality of threads in a first group of fast allocating threads;

computer code for determining when the first block has overflowed;

computer code for determining whether an attempt by the first thread to allocate the first object in the first block caused the first block to overflow when it is determined that the first block has overflowed;

computer code for assigning a second block selected from the plurality of blocks to the first thread when it is determined that the attempt by the first thread to allocate the first object in the first block caused the first block to overflow, wherein assigning the second block to the first thread is arranged to case the first thread to no longer attempt to allocate objects in the first block; and a computer readable medium that stores the computer codes.

15. A computer program product according to claim 14 further including:

computer code for determining when one of the first block and the second block have overflowed;

computer code for assigning a third block selected from the plurality of blocks to the first thread when it is determined that the second block overflowed; and computer code for assigning the third block to the second thread when it is determined that the first block overflowed.

16. A computer program product according to claim 14 wherein the computer readable medium is one of a data signal embodied in a carrier wave, a CD-ROM, a computer disk, a computer tape, and a computer disk drive.

17. A computer program product for allocating shared memory in a multi-threaded computing system, the multi-threaded computing system including at least a first thread and a second thread, the computer program product comprising:

computer code that partitions the shared memory into multiple blocks, the multiple blocks including a plurality of blocks of a first size and least one block of a second size;

computer code that assigns a first block selected from the plurality of blocks of the first size to the first thread wherein the first thread is a fast allocating thread arranged to attempt to allocate a first object in the first block;

computer code that assigns a second block selected from the plurality of blocks of the first size to the second thread, wherein the second thread is arranged to attempt to allocate a second object in the second block;

computer code that determines when one of the first block and the second block has overflowed;

computer code that determines whether a third block of the second size is available;

computer code that assigns the third block to the first thread when it is determined that the third block is available and when it is determined that the first block has overflowed;

computer code that assigns the third block to the second thread when it is determined that the third block is available and when it is determined that the second block has overflowed; and a computer readable medium that stores the computer codes.

18. A computer-implemented method for allocating memory in a multi-threaded computing system, the multi-threaded computing system including at least a first thread and a second thread, the method comprising:

partitioning the memory into a plurality of blocks, the plurality of blocks including a first block and a second block, the first block being of a substantially smaller size than the second block, where the first block has a size in the range of approximately 1 kiloByte to approximately 4 kiloBytes, and the second block has a size in the range of approximately 16 kiloBytes to approximately 32 kiloBytes;

assigning the first block to be accessible to the first thread, the first thread characterized as a slow allocating thread, wherein the first thread is arranged to attempt to allocate a first object in the first block, the first thread associated with a first group configured to contain a plurality of threads; and assigning the second block to be accessible to the second thread, the second thread characterized as a fast allocating thread, wherein the second thread is arranged to attempt to allocate a second object in the second block, wherein the first thread is not arranged to attempt to allocate the first object in the second block and the second thread is not arranged to attempt to allocate the second object in the first block.

19. A computer-implemented method as recited in claim 18 wherein the first block has a size in the range of approximately 1 kiloByte to approximately 4 kilobytes, and the second block has a size in the range of approximately 16 kiloBytes to approximately 32 kiloBytes.

* * * * *

UNITED STATES PATENT AND TRADEMARK OFFICE
CERTIFICATE OF CORRECTION

PATENT NO. : 6,510,498 B1
DATED : January 21, 2003
INVENTOR(S) : Hölze et al.

It is certified that error appears in the above-identified patent and that said Letters Patent is hereby corrected as shown below:

Column 28,
Line 66, please add claim 20 as follows:
-- 20. A method as recited in claim 8 wherein the size of the blocks in the plurality of blocks is in the range of approximately 2 kiloBytes to approximately 32 kiloBytes. --

Signed and Sealed this

Twenty-second Day of June, 2004

JON W. DUDAS
*Acting Director of the United States Patent and Trademark Office*